US012380832B2

(12) United States Patent
Jeong et al.

(10) Patent No.: US 12,380,832 B2
(45) Date of Patent: Aug. 5, 2025

(54) PROCESSOR, DISPLAY DEVICE INCLUDING THE SAME, AND METHOD FOR DRIVING THE SAME

(71) Applicant: SAMSUNG DISPLAY CO., LTD., Yongin-si (KR)

(72) Inventors: Ji Woong Jeong, Yongin-si (KR); Hye Ji Kim, Yongin-si (KR); Jung Ki Min, Yongin-si (KR); Bo Young An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/668,325

(22) Filed: May 20, 2024

(65) Prior Publication Data

US 2025/0140161 A1 May 1, 2025

(30) Foreign Application Priority Data

Oct. 25, 2023 (KR) ........................ 10-2023-0144217

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0842* (2013.01); *G09G 2320/0233* (2013.01); *G09G 2360/145* (2013.01)

(58) Field of Classification Search
CPC ............... G09G 3/2096; G09G 3/3233; G09G 2300/0842; G09G 2320/0233; G09G 2360/145
USPC ........................................................... 345/690
See application file for complete search history.

(56) References Cited

U.S. PATENT DOCUMENTS

| | | | | |
|---|---|---|---|---|
| 10,755,635 B2 | 8/2020 | Yang et al. | | |
| 11,036,339 B2 * | 6/2021 | Kim | ...................... | G06F 3/0412 |
| 11,620,955 B2 | 4/2023 | Lee et al. | | |
| 11,721,271 B2 | 8/2023 | Jeong et al. | | |
| 2022/0208883 A1 * | 6/2022 | Kim | ..................... | H10K 59/123 |

(Continued)

FOREIGN PATENT DOCUMENTS

| | | |
|---|---|---|
| CN | 116013179 A | 4/2023 |
| KR | 1902564 B1 | 11/2018 |

(Continued)

*Primary Examiner* — Tom V Sheng
(74) *Attorney, Agent, or Firm* — F. CHAU & ASSOCIATES, LLC

(57) ABSTRACT

A processor including: an interface circuit to receive first image data and convert the first image data into second image data; a pattern detecting circuit to detect a pattern in the first or second image data; a brightness detecting circuit to detect a panel brightness value, and to detect a ratio of pixels emitting light; and a real-time sensing circuit, wherein when the pattern is not detected, the real-time sensing circuit performs/stops real-time sensing of the pixels based on whether the panel brightness value is within a range and the ratio of pixels emitting light is greater than or equal to a first threshold; and when the pattern is detected, the real-time sensing circuit performs/stops the real-time sensing of the pixels based on whether the panel brightness value is within the range and the ratio of pixels emitting light is greater than or equal to a second threshold.

20 Claims, 15 Drawing Sheets

(56) References Cited

U.S. PATENT DOCUMENTS

| | | | | |
|---|---|---|---|---|
| 2022/0351689 | A1* | 11/2022 | Kim | G09G 3/2003 |
| 2023/0215356 | A1* | 7/2023 | Han | G09G 3/3233<br>345/690 |
| 2023/0215382 | A1* | 7/2023 | Hong | G09G 3/3233<br>345/214 |
| 2023/0298524 | A1* | 9/2023 | Cho | G09G 3/3233<br>345/691 |
| 2023/0410719 | A1* | 12/2023 | Park | G09G 3/3233 |
| 2024/0008325 | A1* | 1/2024 | Joo | G09G 3/3233 |
| 2024/0290246 | A1* | 8/2024 | Seo | G09G 3/3266 |
| 2024/0290281 | A1* | 8/2024 | Han | G09G 3/32 |
| 2024/0290797 | A1* | 8/2024 | Jang | H10D 86/443 |

FOREIGN PATENT DOCUMENTS

| | | | |
|---|---|---|---|
| KR | 10-2022-0152434 | A | 11/2022 |
| KR | 10-2023-0058234 | A | 5/2023 |

* cited by examiner

PXC: TR1, TR2, TR3, Cst

PROCESSOR, DISPLAY DEVICE INCLUDING THE SAME, AND METHOD FOR DRIVING THE SAME

CROSS-REFERENCE TO RELATED APPLICATION

This application claims priority under 35 U.S.C. § 119 to Korean Patent Application No. 10-2023-0144217 filed in the Korean Intellectual Property Office on Oct. 25, 2023, the disclosure of which is incorporated by reference herein in its entirety.

TECHNICAL FIELD

Embodiments of the present disclosure relate to a processor, a display device including the same, and a method for driving the same.

DESCRIPTION OF THE RELATED ART

With the advancement of information technology, the significance of a display device, which is a connection medium between users and information has become increasingly prominent. Accordingly, the use of display devices such as a liquid crystal display device, and an organic light emitting display device, has seen a notable rise.

The display device may include a display panel on which a plurality of pixels are disposed. Each of the plurality of pixels may include a pixel circuit including one or more switching elements, such as transistors, for example.

As the display device is driven, the characteristic value of the transistor within the pixel circuit may be changed. Sensing a change in the transistor's characteristic value and compensating for the change can enhance display quality.

When a change in the characteristic value of the transistor is sensed while displaying a low grayscale image on the display device, a dark horizontal line may become visible. Therefore, a method to mitigate the visibility of the horizontal line is desired.

SUMMARY OF THE INVENTION

The present disclosure provides a processor that can prevent a horizontal line from becoming visible, a display device including the same, and a method for driving the same.

An embodiment of the present disclosure provides a processor including: an interface circuit configured to receive first image data and convert the first image data into second image data; a pattern detecting circuit configured to detect a pattern in the first image data or the second image data; a brightness detecting circuit configured to detect a panel brightness value, which is a brightness value at which a plurality of pixels emit light in response to the second image data, and to detect a ratio of pixels emitting light among the plurality of pixels in response to the second image data; and a real-time sensing circuit, wherein when the pattern is not detected, the real-time sensing circuit performs or stops real-time sensing of the plurality of pixels based on whether the panel brightness value is within a set range and the ratio of the pixels emitting light is greater than or equal to a first threshold; and when the pattern is detected, the real-time sensing circuit performs or stops the real-time sensing of the plurality of pixels based on whether the panel brightness value is within the set range and the ratio of the pixels emitting light is greater than or equal to a second threshold.

The real-time sensing circuit, when the pattern is not detected, stops the real-time sensing of the plurality of pixels when the panel brightness value is within the set range and the ratio of the pixels emitting light is greater than or equal to the first threshold, and performs the real-time sensing of the plurality of pixels when the panel brightness value is outside the set range or the ratio of the pixels emitting light is less than the first threshold.

The real-time sensing circuit, when the pattern is detected, stops the real-time sensing of the plurality of pixels when the panel brightness value is within the set range and the ratio of the pixels emitting light is greater than or equal to the second threshold, and performs the real-time sensing of the plurality of pixels when the panel brightness value is outside the set range or the ratio of the pixels emitting light is less than the second threshold.

The first threshold is greater than the second threshold.

At least one pixel displaying the pattern among the plurality of pixels is controlled to alternate between emitting light and not emitting light as a frame progresses.

An embodiment of the present disclosure provides a processor including: an interface circuit configured to receive first image data and convert the first image data into second image data; a pattern detecting circuit configured to detect a pattern in the first image data or the second image data; a brightness detecting circuit configured to detect a panel brightness value, which is a brightness value at which a plurality of pixels emit light in response to the second image data, and to detect a ratio of pixels emitting light among the plurality of pixels in response to the second image data; and a real-time sensing circuit, wherein when the pattern is not detected, the real-time sensing circuit performs or stops real-time sensing of the plurality of pixels based on whether the panel brightness value is within a set range and the ratio of the pixels emitting light is greater than or equal to a set threshold; and when the pattern is detected, the real-time sensing circuit stops the real-time sensing of the plurality of pixels.

The real-time sensing circuit stops the real-time sensing of the plurality of pixels when the panel brightness value is within the set range and the ratio of the pixels emitting light is greater than or equal to the set threshold, and performs the real-time sensing of the plurality of pixels when the panel brightness value is outside the set range or the ratio of the pixels emitting light is less than the set threshold.

An embodiment of the present disclosure provides a display device including: a display panel including a plurality of pixels, a plurality of data lines electrically connected to the plurality of pixels, and a plurality of reference voltage lines electrically connected to the plurality of pixels; an output circuit configured to supply a data voltage to the plurality of data lines; a sensing circuit configured to sense the plurality of pixels through the plurality of reference voltage lines; and a timing controller configured to control driving timing of the output circuit and the sensing circuit, wherein the timing controller receives first image data and converts the first image data into second image data to be inputted to the output circuit; detects a pattern in the first image data or the second image data; detects a panel brightness value, which is a brightness value at which a plurality of pixels emit light in response to the second image data, and detects a ratio of pixels emitting light among the plurality of pixels in response to the second image data; performs or stops real-time sensing of the plurality of pixels based on whether the panel brightness value is within a set range and the ratio of the pixels emitting light is greater than or equal to a set first threshold, when the pattern is not detected; and performs or stops the real-time sensing of the plurality of pixels based on whether the panel brightness value is within the set range and the ratio of the pixels emitting light is greater than or equal to a second threshold that is smaller than the first threshold, when the pattern is detected.

The timing controller, when the pattern is not detected, stops the real-time sensing of the plurality of pixels when the panel brightness value is within the set range and the ratio of the pixels emitting light is greater than or equal to the first threshold, and performs the real-time sensing of the plurality of pixels when the panel brightness value is outside the set range or the ratio of the pixels emitting light is less than the first threshold.

The timing controller, when the pattern is detected, stops the real-time sensing of the plurality of pixels when the panel brightness value is within the set range and the ratio of the pixels emitting light is greater than or equal to the second threshold, and performs the real-time sensing of the plurality of pixels when the panel brightness value is outside the set range or the ratio of the pixels emitting light is less than the second threshold.

The pattern is a pattern in which a pixel that emits light and a pixel that does not emit light are repeated in one unit among the plurality of pixels.

The pattern is a pattern in which a pixel that emits light and a pixel that does not emit light are repeated in two or more units among the plurality of pixels.

Each of the plurality of pixels includes a plurality of sub-pixels, and the pattern is a pattern in which a sub-pixel that emits light and a sub-pixel that does not emit light are repeated in one unit among the plurality of sub-pixels.

Each of the plurality of pixels includes a plurality of sub-pixels, and the pattern is a pattern in which a sub-pixel that emits light and a sub-pixel that does not emit light are repeated in two or more units among the plurality of sub-pixels.

The timing controller detects the pattern in pixels disposed in a predetermined area among the plurality of pixels.

A plurality of first and second scan lines that are electrically connected to the plurality of pixels are further included in the display panel; the display device further includes a scan driving circuit configured to supply a first scan signal to the plurality of first scan lines and a second scan signal to the plurality of second scan lines; each of the plurality of pixels includes at least one pixel circuit; and the pixel circuit further includes a first transistor including a gate electrode electrically connected to a first node, a first electrode electrically connected to a first power supply line, and a second electrode electrically connected to a second node; a second transistor configured to switch an electrical connection between the first node and a corresponding one of the plurality of data lines in response to the first scan signal; a third transistor configured to switch an electrical connection between the second node and a corresponding one of the plurality of reference voltage lines in response to the second scan signal; and a storage capacitor including a first electrode connected to the first node and a second electrode connected to the second node.

The timing controller, while performing the real-time sensing of one of the plurality of pixels, calculates a voltage increase per unit time of the reference voltage line during a period in which the second scan signal at a turn-on level is inputted to the second transistor.

An embodiment of the present disclosure provides a driving method of a display device including a processor, the method including: receiving first image data and converting the first image data into second image data; detecting a pattern in the first image data or the second image data; and detecting a panel brightness value, which is a brightness value at which a plurality of pixels emit light in response to the second image data, and detecting a ratio of pixels emitting light among the plurality of pixels in response to the second image data, determining, when the pattern is not detected, whether the panel brightness value is within a set range and the ratio of the pixels emitting light is greater than or equal to a first threshold, and determining, when the pattern is detected, whether the panel brightness value is within the set range and the ratio of the pixels emitting light is greater than or equal to a second threshold that is smaller than the first threshold.

The driving method further including: stopping sensing of the plurality of pixels when the panel brightness value is within the set range and the ratio of the pixels emitting light is greater than or equal to the first threshold, and performing sensing of the plurality of pixels when the panel brightness value is outside the set range and the ratio of the pixels emitting light is less than the first threshold.

The driving method further including: stopping sensing of the plurality of pixels when the panel brightness value is within the set range and the ratio of the pixels emitting light is greater than or equal to the second threshold, and performing sensing of the plurality of pixels when the panel brightness value is outside the set range and the ratio of the pixels emitting light is less than the second threshold.

DETAILED DESCRIPTION OF THE EMBODIMENTS

Figure 1:
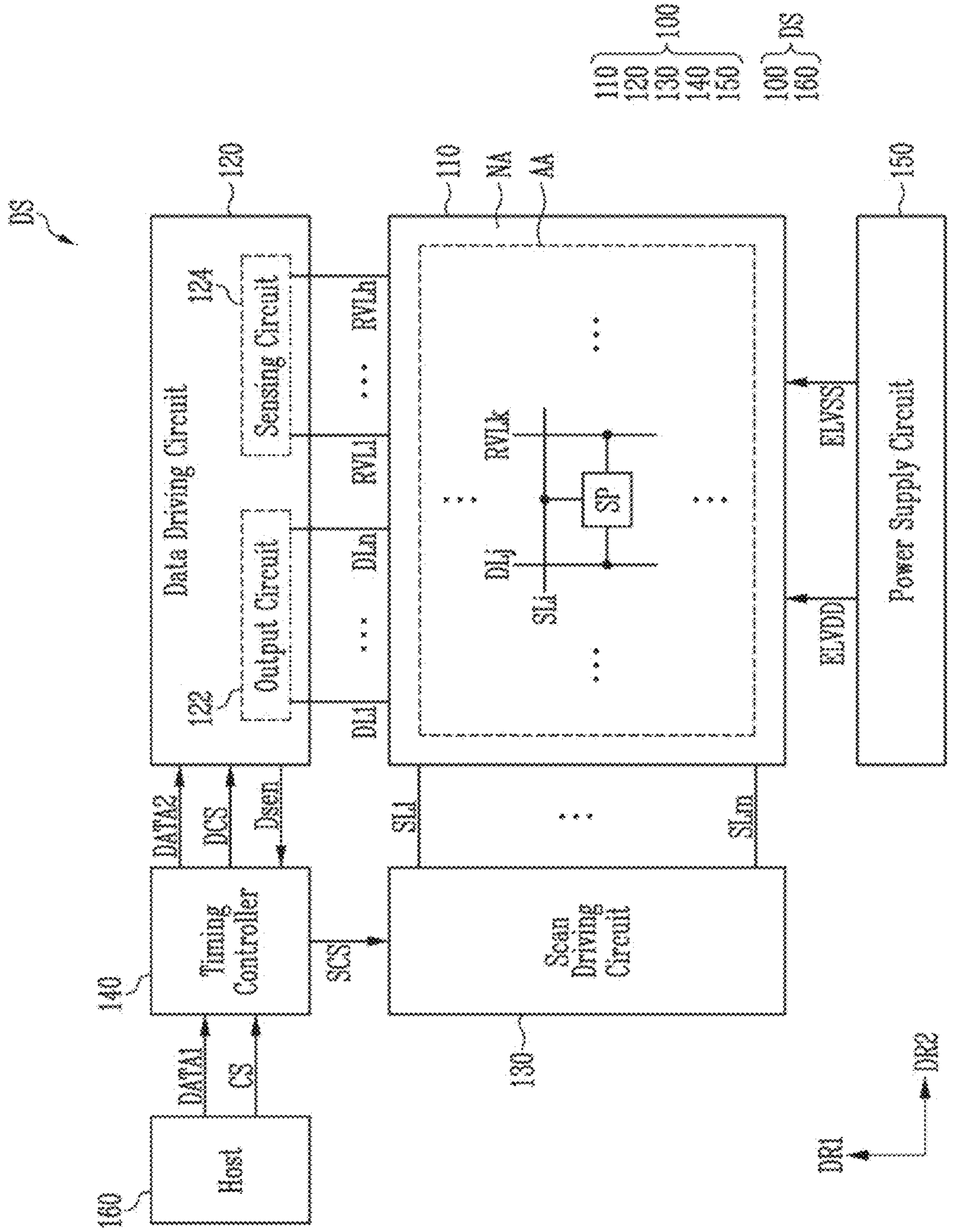
FIG. 1 illustrates a system block diagram of a display device according to embodiments of the present disclosure.

Embodiments of the present disclosure will be described more fully hereinafter with reference to the accompanying drawings. As those skilled in the art would realize, the described embodiments may be modified in various different ways.

In order to clearly describe the present disclosure, parts or portions that are irrelevant to the description may be omitted, and identical or similar constituent elements throughout the specification may be denoted by the same reference numerals. For example, the reference numerals used in one drawing may be used in another drawing.

Further, in the drawings, the size and thickness of each element are illustrated for ease of description, and thus, the present disclosure is not necessarily limited to the sizes and thicknesses of the elements illustrated in the drawings. In the drawings, the thicknesses of layers, films, panels, regions, areas, etc. may be exaggerated for clarity.

In addition, the expression "equal to or the same as" in the description may mean "substantially equal to or the same as".

Terms such as first, second, and the like will be used to describe various constituent elements, and are not to be interpreted as limiting these constituent elements. The terms are used to differentiate one constituent element from other constituent elements. For example, a first constituent element could be termed a second constituent element, and similarly, a second constituent element could be termed as a first constituent element. Singular forms are intended to include plural forms unless the context clearly indicates otherwise.

Terms such as "below", "the lower side", "on", and "the upper side" are used to describe relationships or configurations of elements shown in the drawings. Such terms are understood to provide relative descriptions based on one or more directions shown in the drawings.

Unless otherwise defined, all terms (including technical and scientific terms) used herein have the same meaning as commonly understood by those skilled in the art to which this disclosure belongs. In addition, terms should be interpreted as having meanings consistent with their meaning in the context of the related art or as defined in commonly used dictionaries, unless as explicitly set forth here. Further, the terms should not be limited to being interpreted in an ideal or overly formal sense.

It should be understood that the terms "include", "comprise", "have", or "configure" indicate that a feature, a number, a step, an operation, a constituent element, a part, or a combination thereof described in the specification is present, but does not exclude the possibility of the presence or addition of one or more other features, numbers, steps, operations, constituent elements, parts, or combinations.

FIG. 1 illustrates a system block diagram of a display device 100 according to embodiments of the present disclosure.

Referring to FIG. 1, the display device 100 according to the embodiments of the present disclosure may include a display panel 110, a data driving circuit 120, a scanning driving circuit 130, a timing controller 140, a power supply circuit 150, and the like.

A plurality of sub-pixels SP are disposed in the display panel 110. A plurality of data lines DL1 to DLn (n is an integer greater than or equal to 2), a plurality of scan lines SL1 to SLm (m is an integer greater than or equal to 2), a plurality of reference voltage lines RVL1 to RVLh (h is an integer greater than or equal to 2), and the like, which are electrically connected to a plurality of sub-pixels SP, may be disposed in the display panel 110. One or more power supply voltage lines configured to apply a power supply voltage (for example, a first power supply voltage ELVDD, a second power supply voltage ELVSS, and the like) to the plurality of sub-pixels SP may be disposed in the display panel 110.

The display panel 110 may include a display area AA in which the plurality of sub-pixels SP are disposed, and a non-display area NA disposed around the display area AA (for example, at an edge of the display area AA).

The display panel 100 may be formed flat, but embodiments of the present disclosure are not limited thereto. For example, the display panel 100 may include curved portions formed at left and right ends thereof. The curved portion may have a constant curvature or a changing curvature. In addition, the display panel 110 may be flexibly formed to be bent, curved, folded, or rolled.

The plurality of sub-pixels SP may be disposed in a matrix type in the display area AA. In some embodiments, in the display area AA, the plurality of sub-pixels SP may be disposed in a PENTILE™ structure.

The plurality of data lines DL1 to DLn may be disposed to extend in a first direction DR1 in the display panel 110. The first direction DR1 may be, for example, a direction crossing from an upper side to a lower side of the display panel 110, but embodiments of the present disclosure are not limited thereto.

The plurality of scan lines SL1 to SLm may be disposed to extend in a second direction DR2 in the display panel 110. The second direction DR2 may be a different direction from the first direction DR1, but embodiments of the present disclosure are not limited thereto. For example, the second direction may be a direction crossing from the left side to the right side of the display panel 110.

The plurality of reference voltage lines RVL1 to RVLh may be disposed to extend in the first direction DR1 in the display panel 110. However, embodiments of the present disclosure are not limited thereto.

The data driving circuit 120 may include an output circuit 122 and a sensing circuit 124. In some embodiments, the output circuit 122 and the sensing circuit 124 may be disposed to be functionally separate within the same integrated circuit. In some embodiments, the output circuit 122 and the sensing circuit 124 may be respectively disposed in different integrated circuits.

The output circuit 122 may be configured to supply a data voltage to the plurality of data lines DL1 to DLn. The output circuit 122 may generate a data voltage based on input image data DATA2 and a data driving circuit control signal DCS, and output the generated data voltage to the plurality of data lines DL1 to DLn in accordance with a specific timing. The data driving circuit control signal DCS may include, for example, a source start pulse (SSP), a source shift clock (SSC), a source output enable (SOE), and the like.

The sensing circuit 124 is configured to input a reference voltage to the plurality of reference voltage lines RVL1 to RVLk in response to the data driving circuit control signal DCS and to sense the voltage of the plurality of reference voltage lines RVL1 to RVLk. The sensing circuit 124 may convert the sensed voltage of the plurality of reference voltage lines RVL1 to RVLk into a corresponding digital value Dsen and output the converted digital value Dsen. The sensing circuit 124 may include one or more analog-to-digital converters (ADC). The data driving circuit control signal DCS may include, for example, a reference voltage switching signal, a sampling control signal, a hold control signal, and the like. A detailed description of the signals will be described later with reference to FIG. 4.

The data driving circuit 120 may be implemented as an integrated circuit (for example, a source driver integrated circuit (SDIC)) formed separately from the display panel 110, or may be formed together with the display panel 110 in at least a partial area on the non-display area NA of the display panel 110.

The scan driving circuit 130 is configured to output a scan signal to the plurality of scan lines SL1 to SLn in response to a scan driving circuit control signal SCS. The scan driving circuit control signal SCS may include a start signal indicating the start of a frame, a horizontal synchronization signal for outputting a scan signal according to the timing at which the data voltage is applied, and the like.

The scan driving circuit 130 may be implemented as a gate driver integrated circuit (GDIC) formed separately from the display panel 110, or may be formed together with the display panel 110 to be formed in at least a partial area of the non-display area NA of the display panel 110.

The timing controller 140 may be configured to control the data driving circuit 120 and the scan driving circuit 130. The timing controller 140 may generate and output the control signals DCS and SCS for controlling the data driving circuit 120 and the scan driving circuit 130 based on a control signal CS (for example, a vertical synchronization signal, a clock signal, a data enable signal, and the like) received through a host 160. In some embodiments, the timing controller 140 may generate a synchronization signal, a data enable signal, and the like based on the control signal CS (for example, information regarding the driving frequency or frame rate of the image displayed on the display panel 110) received through the host 160.

The timing controller 140 may receive a first image data DATA1 from the host 160 and arrange the inputted first image data DATA1 in units of pixel rows. The timing controller 140 may convert the inputted first image data DATA1 according to a preset interface (for example, low voltage differential signaling (LVDS), display port (DP), embedded display port (eDP), and the like). The second image data DATA2 that the timing controller 140 outputs to the data driving circuit 120 may be converted inside the timing controller 140 according to the preset interface.

In some embodiments, the timing controller 140 may be a logic type and disposed in the display device 100. In some embodiments, the timing controller 140 may be a processor type and disposed within the display device 100. The timing controller 140 may include one or more memories (for example, registers and the like).

The power supply circuit 150 may be configured to output a constant voltage at a constant voltage level. The power supply circuit 150 may output a power supply voltage (for example, the first power supply voltage ELVDD, the second power supply voltage ELVSS, and the like) and supply it to the display panel 110. In some embodiments, the power supply circuit 150 may output a voltage (for example, a gate high voltage, a gate low voltage, and the like) and supply it to the scan driving circuit 130. In some embodiments, the power supply circuit 150 may output a voltage (for example, a gamma voltage, a reference voltage, and the like) and supply it to the data driving circuit 120. The power supply circuit 150 may include, for example, a regulator (for example, a low dropout (LDO) regulator). The power supply circuit 150 may be implemented, for example, as a power management integrated circuit (PMIC).

The host 160 may include a set-top box, an application processor (AP), and the like. In some embodiments, the host 160 may be a component outside the display device 100 that is not included in the display device 100, and in some embodiments, the host 160 may be mounted within the display device 100. The first image data DATA1 and the control signal CS may be transmitted and received between the host 160 and the display device 100 through an interface (for example, a serial programming interface (SPI), an inter-integrated circuit (I2C), a mobile industry processor interface (MIPI), and the like).

A display system DS according to embodiments of the present disclosure may include the display device 100 and the host system 160.

In FIG. 1, the circuits 120, 130, 140, and 150 that supply signals, voltages, and the like to the display panel 110 are classified according to their functions. For example, the data driving circuit 120 and the timing controller 140 may be formed in one integrated circuit. The data driving circuit 120 and the timing controller 140 may be classified according to their functions within one integrated circuit within the display device 100.

The display device 100 according to the embodiments of the present disclosure may be used as a display screen of a portable electronic device such as a mobile phone, a smart phone, a tablet personal computer (PC), a smart watch, a watch phone, a mobile communication terminal, an electronic note, an electronic book, a portable multimedia player (PMP), a navigation device, and an ultra-mobile personal computer (UMPC), and may be used as display screens of various products such as a television, a laptop, a monitor, a billboard, an Internet of Things (IoT).

Figure 2:
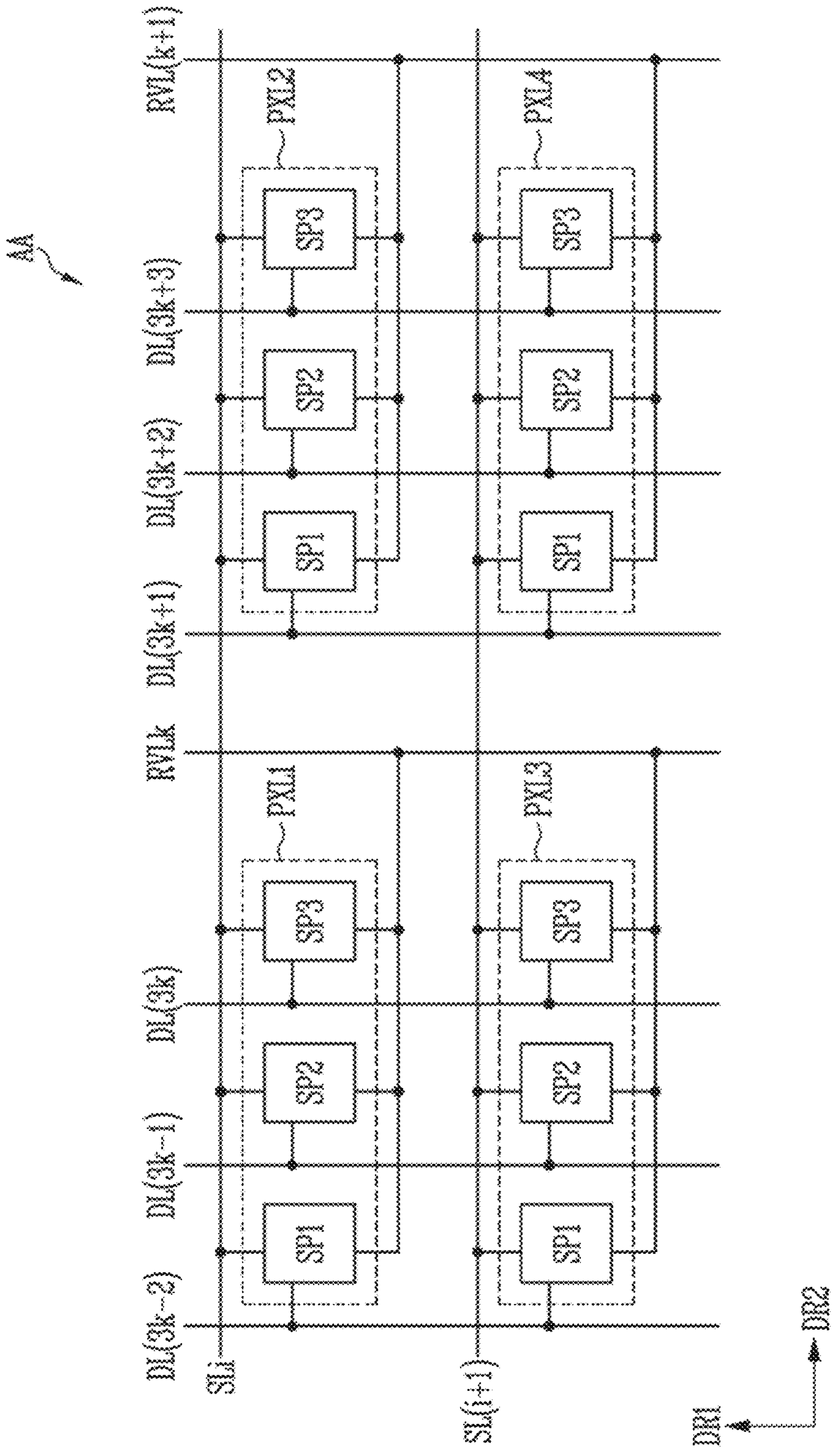
FIG. 2 illustrates a schematic view of a display area according to embodiments of the present disclosure.

FIG. 2 illustrates a schematic view of the display area AA according to embodiments of the present disclosure.

Referring to FIG. 2, a plurality of pixels (for example, first, second, third and fourth pixels PXL1, PXL2, PXL3, and PXL4; hereinafter also referred to as PXL1 to PXL4) disposed in a matrix type is illustratively shown. Referring to FIG. 2, the four pixels PXL1 to PXL4 may be disposed adjacent to each other in a row direction, or may be disposed adjacent to each other in a column direction.

One of the four pixels PXL1 to PXL4 (for example, the first pixel PXL1 disposed at an upper left end) may include a plurality of sub-pixels (for example, first, second and third sub-pixels SP1, SP2, and SP3). Hereinafter, for better understanding and ease of description, the display area AA will be described focusing on the four pixels PXL1 to PXL4 disposed in two rows and two columns. In addition, an embodiment in which each of the four pixels PXL1 to PXL4 includes three sub-pixels SP1 to SP3 will be described as an example. However, embodiments of the present disclosure are not limited thereto.

The three sub-pixels SP1, SP2, and SP3 configuring one pixel (for example, the first pixel PXL1) may each be configured to emit light of different wavelength bands. For example, the first sub-pixel SP1 may be configured to emit light in the red wavelength band. For example, the second sub-pixel SP2 may be configured to emit light in the green wavelength band. For example, the third sub-pixel SP3 may be configured to emit light in the blue wavelength band. In some embodiments, one pixel (for example, the first pixel PXL1) may further include a white sub-pixel configured to emit white light. In some embodiments, one pixel (for example, the first pixel PXL1) may include two or more sub-pixels (for example, two or more second sub-pixels SP2) configured to emit green light.

The red wavelength band may be a wavelength band of about 600 nm (nanometers) to about 750 nm. The green wavelength band may be a wavelength band of about 480 nm to about 560 nm. The blue wavelength band may be a wavelength band of about 370 nm to about 460 nm.

In embodiments of the present disclosure, the sub-pixels SP1, SP2, and SP3 configuring one pixel (for example, the first pixel PXL1) may each be electrically connected to a corresponding data line. For example, the first sub-pixel SP1, the second sub-pixel SP2, and the third sub-pixel SP3 of the first pixel PXL1 (or the third pixel PXL3) may be electrically connected to three consecutive data lines DL(3k−2), DL(3k−1), and DL(3k) (k is an integer greater than or equal to 1 and less than h), respectively. For example, the first sub-pixel SP1, the second sub-pixel SP2, and the third sub-pixel SP3 of the second pixel PXL2 (or the fourth pixel PXL4) may be electrically connected to the three consecutive data lines DL(3k+1), DL(3k+2), and DL(3k+3), respectively.

In embodiments of the present disclosure, the sub-pixels SP1, SP2, and SP3 configuring one pixel (for example, the first pixel PXL1) may be electrically connected to one reference voltage line. For example, the first sub-pixel SP1, the second sub-pixel SP2, and the third sub-pixel SP3 of the first pixel PXL1 (or the third pixel PXL3) may be electrically connected to the k-th reference voltage line RVLk. For example, the first sub-pixel SP1, the second sub-pixel SP2, and the third sub-pixel SP3 of the second pixel PXL2 (or the fourth pixel PXL4) may be electrically connected to the (k+1)-th reference voltage line RVL(k+1). In some embodiments, the sub-pixels SP1, SP2, and SP3 configuring one pixel (for example, the first pixel PXL1) may be electrically connected to different reference voltage lines, respectively. In some embodiments, the sub-pixels SP1 and SP2 of the first pixel PXL1 may be electrically connected to a first reference voltage line, while the sub-pixel SP3 of the first pixel PXL1 may be electrically connected to a second reference voltage line.

In embodiments of the present disclosure, the sub-pixels SP1, SP2, and SP3 configuring one pixel (for example, the first pixel PXL1) may be electrically connected to one scan line. For example, the first sub-pixel SP1, the second sub-pixel SP2, and the third sub-pixel SP3 of the first pixel PXL1 (or the second pixel PXL2) may be electrically connected to the i-th scan line SLi (i is an integer greater than 1 and less than m). For example, the first sub-pixel SP1, the second sub-pixel SP2, and the third sub-pixel SP3 of the third pixel PXL3 (or the fourth pixel PXL4) may be electrically connected to the (i+1)-th scan line SL(i+1).

Referring to FIG. 2, the first pixel PXL1 and the second pixel PXL2, which are electrically connected to the same scan line SLi, may be understood as being disposed in the same row (or pixel row). For example, the first pixel PXL1 and the second pixel PXL2 may be disposed in a first row. The third pixel PXL3 and the fourth pixel PXL4, which are electrically connected to the same scan line SL(i+1), may be understood as being disposed in the same row (or pixel row). For example, the third pixel PXL3 and the fourth pixel PXL4 may be disposed in a second row.

Referring to FIG. 2, the first pixel PXL1 and the third pixel PXL3, which are electrically connected to the same data lines DL(3k−2), DL(3k−1), and DL(3k), may be understood as being disposed in the same column (or pixel column). For example, the first pixel PXL1 and the third pixel PXL3 may be disposed in a first column. The second pixel PXL2 and the fourth pixel PXL4, which are electrically connected to the same data lines DL(3k+1), DL(3k+2), and DL(3k+3), may be understood as being disposed in the same column (or pixel column). For example, the second pixel PXL2 and the fourth pixel PXL4 may be disposed in a second column.

In embodiments of the present disclosure, the plurality of pixels PXL may be disposed in two or more rows (or pixel rows) and two or more columns (or pixel columns) in the display area AA.

Figure 3:
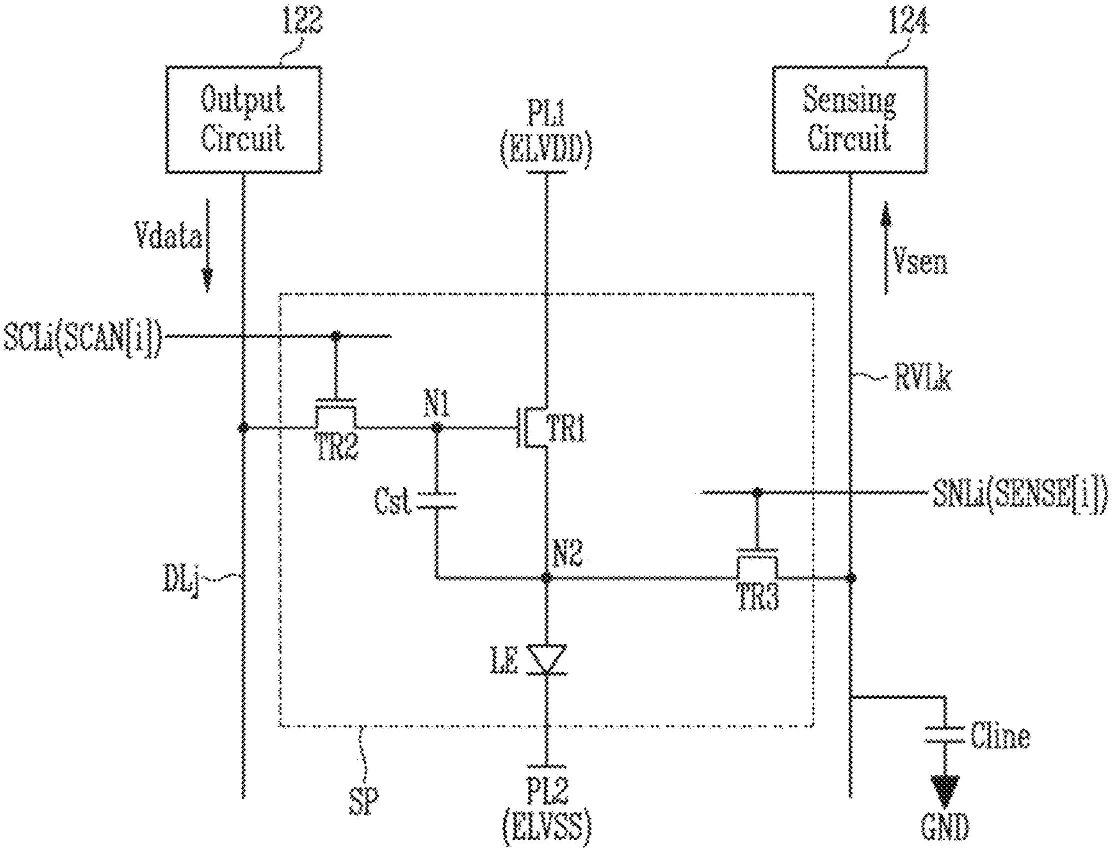
FIG. 3 illustrates an example of a sub-pixel according to embodiments of the present disclosure.

FIG. 3 illustrates an example of the sub-pixel SP according to embodiments of the present disclosure.

The sub-pixel SP according to embodiments of the present disclosure includes a light emitting element LE and a pixel circuit PXC configured to supply a current (for example, a driving current) to the light emitting element LE. The pixel circuit PXC may include two or more switching elements (for example, transistors) and one or more storage elements (for example, capacitors).

FIG. 3 illustrates the pixel circuit PXC including a first transistor TR1, a second transistor TR2, a third transistor TR3, and a storage capacitor Cst. However, the embodiments of the present disclosure are not limited thereto. Hereinafter, an embodiment in which the pixel circuit PXC includes the first to third transistors TR1, TR2, and TR3 and the storage capacitor Cst will be described as an example.

The light emitting element LE may include a first electrode (one of an anode electrode and a cathode electrode), a second electrode (the other one of the anode electrode and the cathode electrode), and a light emitting layer. The light emitting layer may include, for example, an organic material and/or an inorganic material. For example, the light emitting element LE may be implemented as an organic light emitting diode having an organic light emitting layer. For example, the light emitting element LE may be implemented as an inorganic light emitting diode having an inorganic light emitting layer. For example, the light emitting layer of the light emitting element LE may include a nano rod.

Referring to FIG. 3, the first electrode (for example, the anode electrode) of the light emitting element LE may be electrically connected to a second node N2. The second electrode (for example, the cathode electrode) of the light emitting element LE may be electrically connected to a second power supply line PL2.

The second power supply voltage ELVSS is applied to the second power supply line PL2. The second power supply voltage ELVSS may be, for example, a ground voltage, or a low-potential voltage at a level lower than the ground voltage.

The first transistor TR1 may be configured to switch an electrical connection between a first power line PL1 and the second node N2. The first transistor TR1 may include a gate electrode, a first electrode (one of a source electrode and a drain electrode), and a second electrode (the other one of the source electrode and the drain electrode). The gate electrode of the first transistor TR1 may be electrically connected to a first node N1. The first electrode (for example, the drain electrode) of the first transistor TR1 may be electrically connected to the first power supply line PL1. The first power supply voltage ELVDD may be applied to the first power supply line PL1. The first power supply voltage ELVDD, for example, may be a high potential voltage. The second electrode (for example, the source electrode) of the first transistor TR1 may be electrically connected to the second node N2. A data voltage Vdata or a voltage corresponding to the data voltage Vdata may be applied to the first node N1. A current corresponding to the voltage applied to the first node N1 may flow through the first transistor TR1.

The second transistor TR2 is configured to switch an electrical connection between a data line DLj and the first node N1. The operation timing of the second transistor TR2 may be controlled by a first scan signal SCAN[i]. The first scan signal SCAN[i] may be applied to the i-th first scan line SCLi (hereinafter referred to as the first scan line SCLi). The second transistor TR2 may be turned on in response to a first scan signal SCAN[i] at a turn-on level. When the second transistor TR2 is turned on, the data voltage Vdata may be applied to the first node N1, and consequently to the gate electrode of the first transistor TR1.

The third transistor TR3 is configured to switch the electrical connection between the second node N2 and the reference voltage line RVLk. The operation timing of the third transistor TR3 may be controlled by a second scan signal SENSE[i]. The second scan signal SENSE[i] may be applied to the i-th second scan line SNLi (hereinafter referred to as the second scan line SNLi). The third transistor TR3 may be turned on in response to the second scan signal SENSE[i] at the turn-on level. When the third transistor TR3 is turned on, the second node N2 and the reference voltage line RVLk may be electrically connected. The voltage applied to the reference voltage line RVLk may be stored in a line capacitor Cline. The line capacitor Cline may be an intentionally and physically formed capacitor element rather than a parasitic capacitor. However, embodiments of the present disclosure are not limited thereto.

Referring to FIG. 3, each of the first to third transistors TR1, TR2, and TR3 may be a transistor including an N-type semiconductor layer. In this case, the turn-on level voltage of the first to third transistors TR1, TR2, and TR3 may be a high level voltage (for example, a gate high voltage), and the turn-off level voltage of the first to third transistors TR1, TR2, and TR3 may be a low level voltage (for example, a gate low voltage). In some embodiments, at least one of the first to third transistors TR1, TR2, and TR3 may include a P-type semiconductor layer. In this case, the turn-on level voltage of the transistor including the P-type semiconductor layer may be a low level voltage (for example, a gate low voltage), and the turn-off level voltage of transistor including the P-type semiconductor layer may be a high level voltage (for example, a gate high level voltage).

At least one of the first to third transistors TR1, TR2, and TR3 may include a semiconductor layer of amorphous silicon (a-Si). At least one of the first to third transistors TR1, TR2, and TR3 may include a semiconductor layer of polycrystalline silicon (poly-Si). At least one of the first to third transistors TR1, TR2, and TR3 may include a semiconductor layer containing a metal oxide.

The storage capacitor Cst may be configured to maintain a voltage difference between the first node N1 and the second node N2. The storage capacitor Cst may include one electrode (e.g., a first electrode) electrically connected to the first node N1 and the other electrode (e.g., a second electrode) electrically connected to the second node N2. The storage capacitor Cst may be an intentionally and physically formed capacitor element rather than a parasitic capacitor.

The output circuit 122 may output the data voltage Vdata to the data line DLj. An analog sensing voltage Vsen applied to the reference voltage line RVLk may be inputted to the sensing circuit 124.

Figure 4:
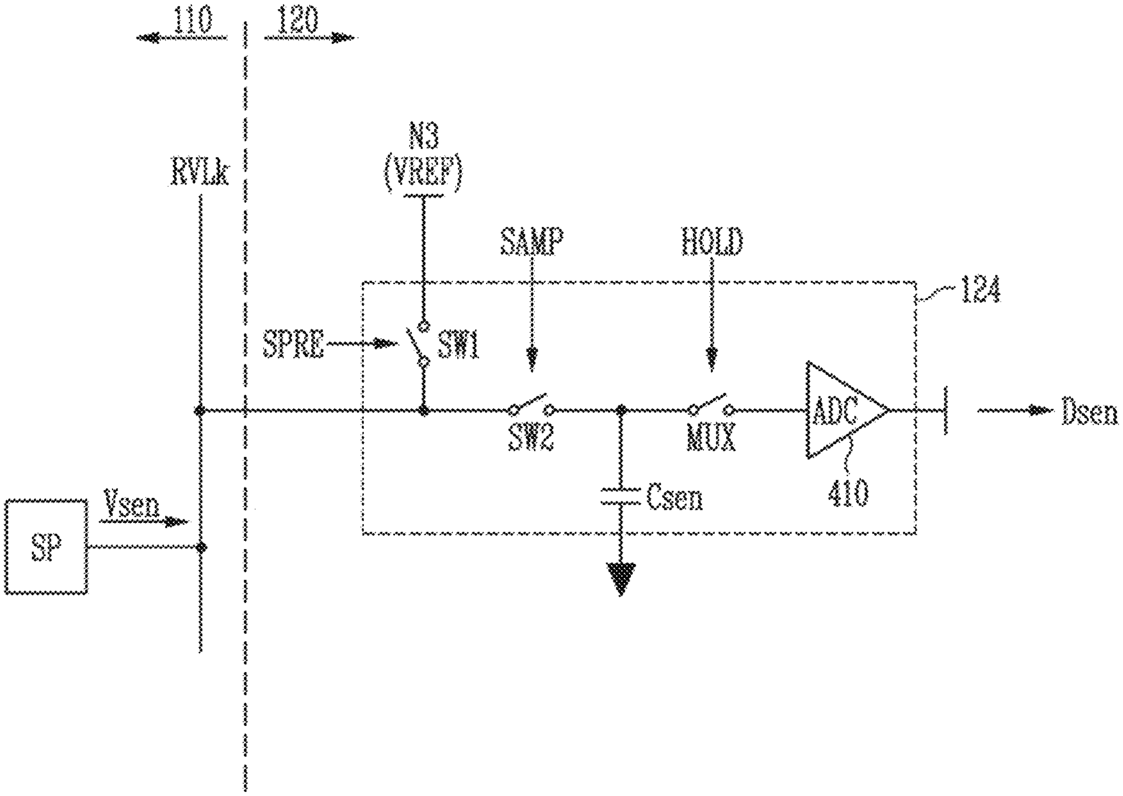
FIG. 4 illustrates a sensing circuit according to embodiments of the present disclosure.

FIG. 4 illustrates the sensing circuit 124 according to embodiments of the present disclosure.

The sensing circuit 124 may be included in the data driving circuit 120. The sensing circuit 124 may receive the analog sensing voltage Vsen from the reference voltage line RVLk. The sensing circuit 124 may convert the received analog sensing voltage Vsen into a corresponding digital value Dsen. The sensing circuit 124 may output the converted digital value Dsen.

Referring to FIG. 4, the sensing circuit 124 may include a first switching element SW1, a second switching element SW2, a multiplexer MUX, a sensing capacitor Csen, and an analog-to-digital converter 410.

The first switching element SW1 may be configured to switch the electrical connection between the third node N3 and the reference voltage line RVLk. The operation timing of the first switching element SW1 may be controlled by a reference voltage switching signal SPRE. When the first switching element SW1 is turned on in response to the reference voltage switching signal SPRE (for example, the reference voltage switching signal SPRE of the turn-on level), a reference voltage VREF may be applied to the reference voltage line RVLk. The first switching element SW1 may be implemented as a transistor.

The second switching element SW2 may be configured to switch the electrical connection between the reference voltage line RVLk and the sensing capacitor Csen. The operation timing of the second switching element SW2 may be controlled by a sampling control signal SAMP. When the second switching element SW2 is turned on by the sampling control signal SAMP (for example, the sampling control signal SAMP of the turn-on level), the analog sensing voltage Vsen or a voltage corresponding thereto may be stored in the sensing capacitor Csen.

The sensing capacitor Csen may include one electrode (e.g., a first electrode) electrically connected to the second switching element SW2 and the other electrode (e.g., a second electrode) to which a constant voltage is applied (or grounded). A voltage corresponding to the analog sensing voltage Vsen may be applied to one electrode of the sensing capacitor Csen. The analog sensing voltage Vsen or a corresponding voltage may be stored in the sensing capacitor Csen.

The multiplexer MUX may be configured to switch the electrical connection between the sensing capacitor Csen and the analog-to-digital converter 410. For example, the multiplexer MUX may be implemented as an N: 1 multiplexer including two or more input terminals (for example, N (N is an integer of 2 or more) input terminals) and one output terminal. The operation timing of the multiplexer MUX may be controlled by a hold control signal HOLD. When the multiplexer MUX is turned on by the hold control signal HOLD (for example, the hold control signal HOLD of the turn-on level), a voltage stored in the sensing capacitor Csen connected (for example, electrically connected) to the corresponding input terminal of the multiplexer MUX may be outputted. The voltage outputted from the multiplexer MUX may be inputted to the analog-to-digital converter 410.

The analog-to-digital converter 410 may be configured to convert an analog voltage into a corresponding digital value. For example, referring to FIG. 4, the analog-to-digital converter 410 may receive the analog voltage outputted from the multiplexer MUX, and may convert the received analog voltage into the corresponding digital value Dsen. The analog-to-digital converter 410 may output the converted digital value Dsen. The outputted digital value Dsen may be inputted to the timing controller 140 (see FIG. 1) described above.

Figure 5:
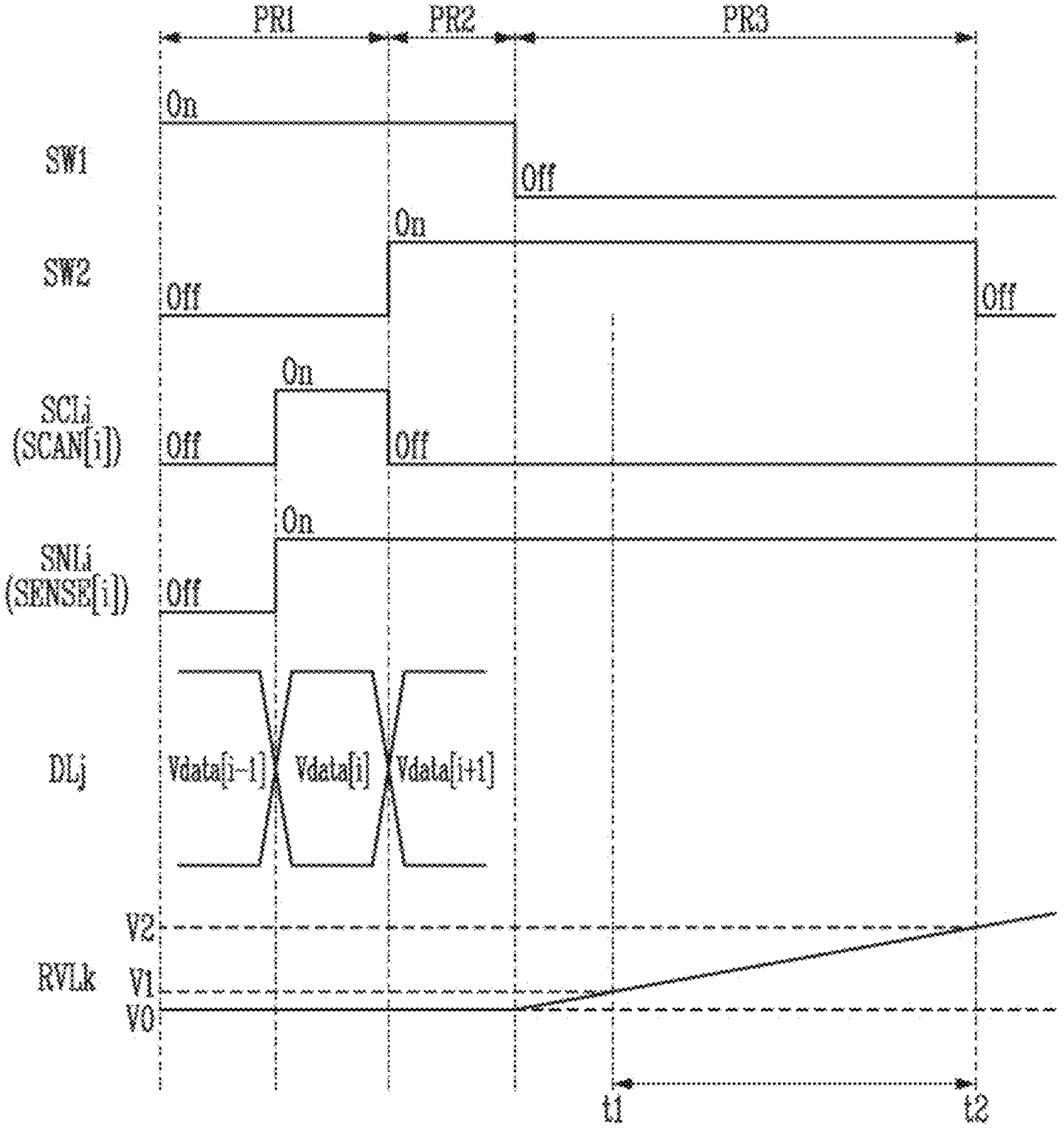
FIG. 5 illustrates an example of a timing diagram in which real-time sensing is performed in a display device according to embodiments of the present disclosure.

FIG. 5 illustrates an example of a timing diagram in which real-time sensing is performed in the display device 100 (see FIG. 1) according to embodiments of the present disclosure.

Hereinafter, a timing diagram of real-time sensing performed in the display device 100 according to the embodiments of the present disclosure will be described with reference to FIG. 1 to FIG. 5.

The real-time sensing involves sensing the characteristic value of the first transistor TR1 to compensate for a change in the characteristic value of the first transistor TR1. The characteristic value of the first transistor TR1 sensed by the real-time sensing may be, for example, mobility.

A period during which the real-time sensing is performed may include a first period PR1, a second period PR2, and a third period PR3. The first period PR1 may correspond to a writing period of the data voltage. The second period PR2 may correspond to an initialization period. The third period PR3 may correspond to a sampling period.

In the first period PR1, a data voltage Vdata[i] may be written to the pixel PXL (or the sub-pixel SP) that is a target of sensing among the plurality of pixels PXL. In the first period PR1, the first switching element SW1 may be turned on and the second switching element SW2 may be turned off. The reference voltage VREF may be applied to the reference voltage line RVLk. In FIG. 5, an initial voltage V0 of the reference voltage line RVLk may correspond to the reference voltage VREF.

In the first period PR1, a first scan signal SCAN[i] may transition from the turn-off level to the turn-on level. During the period when the first scan signal SCAN[i] of the turn-on level is inputted to the first scan line SCLi, the data voltage Vdata[i] may be applied to the data line DLj. The data voltage Vdata[i] may be written to the pixel PXL (or sub-pixel SP) that is the target of the sensing. The data voltage Vdata[i] may be, for example, a data voltage for sensing the first transistor TR1. However, the embodiments of the present disclosure are not limited thereto. In the first period PR1, the data voltage Vdata[i] may be applied to the first node N1. The data voltage Vdata[i] may be the turn-on level voltage of the first transistor TR1.

In the first period PR1, the second scan signal SENSE[i] may transition from the turn-off level to the turn-on level. During the period when the second scan signal SENSE[i] of the turn-on level is inputted to the second scan line SNLi, the second node N2 may be electrically connected to the reference voltage line RVL. The reference voltage VREF may be applied to the second node N2. The voltage of the second node N2 may be initialized to the reference voltage VREF.

In the second period PR2, the first switching element SW1 may be turned on. The reference voltage VREF may be applied to the reference voltage line RVL.

In the second period PR2, the second scan signal SENSE [i] of the turn-on level may be applied to the pixel PXL (or sub-pixel SP) that is the target of the sensing, among the plurality of pixels PXL. As a result, the second node N2 and the reference voltage line RVL may be electrically connected for a sufficient time (for example, the first period PR1 and the second period PR2). The voltage of the second node N2 may be initialized to the reference voltage VREF within a more precise range.

In the second period PR2, the storage capacitor Cst may be charged with a voltage corresponding to the difference between the data voltage Vdata[i] and the reference voltage VREF.

In the second period PR2, the second switching element SW2 may be turned on. The sensing capacitor Csen may be charged with a voltage corresponding to the analog sensing voltage Vsen.

In the third period PR3, the first switching element SW1 may be turned off. The electrical connection between the reference voltage line RVLk and the third node N3 may be disconnected.

In the third period PR3, the second node N2 may be in a state in which a constant voltage is not applied (or in a floating state). The first transistor TR1 may be turned on by the voltage applied to the first node N1, and charges may be accumulated in the second node N2 by the current flowing through the first transistor TR1. The voltage of the second node N2 may increase. In the third period PR3, the voltage difference between the voltage of the second node N2 and the second power supply voltage ELVSS may be smaller than the threshold voltage of the light emitting element LE. In the third period PR3, the light emitting element LE may not emit light.

In the third period PR3, the second scan signal SENSE[i] of the turn-on level may be applied to the pixel PXL (or sub-pixel SP) that is the target of the sensing, among the plurality of pixels PXL. The reference voltage line RVLk and the second node N2 may be electrically connected.

In the third period PR3, the second switching element SW2 may be turned on. For example, the second switching element SW2 may remain turned on. A first voltage V1 may be stored in the sensing capacitor Csen at a first time point t1 during the third period PR3. A second voltage V2 may be stored in the sensing capacitor Csen at a second time point t2 during the third period PR3.

During the third period PR3, the voltage increase amount (or slope of the voltage increase) per unit time of the second node N2 may correspond to the characteristic value (for example, mobility) of the first transistor TR1. For example, when the sampled voltages of the reference voltage line RVLk at the first time point t1 and the second time point t2 during the third period PR3 are the first voltage V1 and the second voltage V2, respectively, the mobility of the first transistor TR1 has the relationship between the above values as set forth in Equation 1 below.

$$\mu oc\frac{V2-V1}{t2-t1} \quad \text{(Equation 1)}$$

In Equation 1, μ refers to a mobility of the first transistor TR1. t2–t1 refers to a time difference between the second time point t2 and the first time point t1. V2–V1 refers to a voltage difference between the second voltage V2 and the first voltage V1. As a result, a change in the characteristic value (for example, mobility) of the first transistor TR1 may be sensed.

Figure 6:
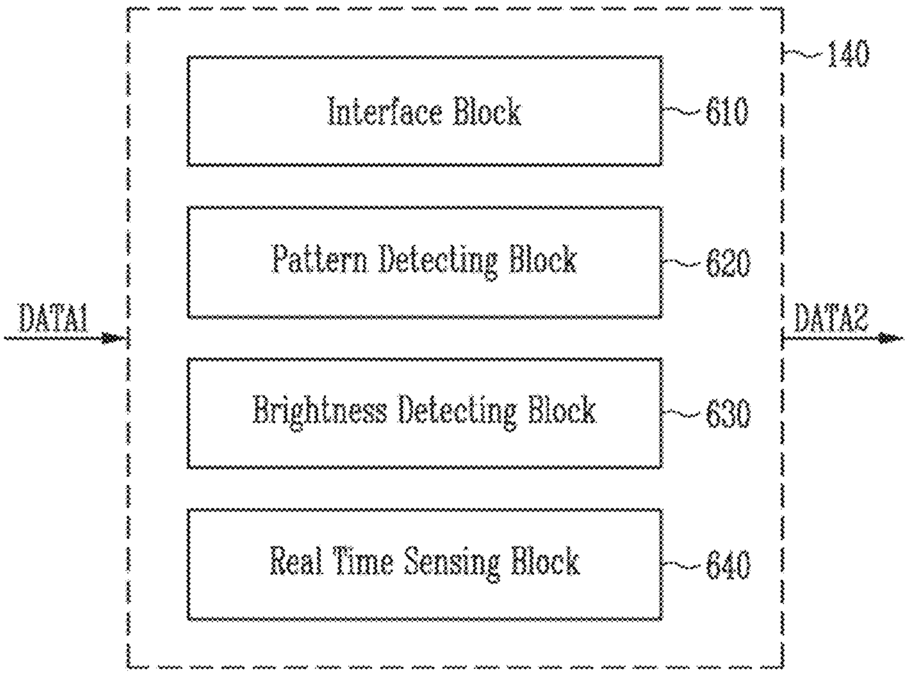
FIG. 6 illustrates a block diagram of a timing controller according to embodiments of the present disclosure.

FIG. 6 illustrates a block diagram of the timing controller 140 according to embodiments of the present disclosure.

The timing controller 140 according to embodiments of the present disclosure may, for example, be implemented as a processor. The timing controller 140 according to embodiments of the present disclosure may include an interface block 610, a pattern detecting block 620, a brightness detecting block 630, and a real-time sensing block 640. Each of the interface block 610, the pattern detecting block 620, the brightness detecting block 630, and the real-time sensing block 640 may be implemented in hardware as a circuit.

The interface block 610 may be configured to convert first image data DATA1 into second image data DATA2. For example, the interface block 610 may convert the first image data DATA1 into the second image data DATA2 according to a preset interface (or a predefined standard).

The pattern detecting block 620 may be configured to detect a pattern in image data. For example, the pattern detecting block 620 may be configured to detect a pattern (for example, a preset pattern) in the first image data DATA1 and/or the second image data DATA2 of a detection area. The detection area is illustratively described with reference to FIG. 7. The pattern is illustratively described with reference to FIGS. 8 to 12.

The brightness detecting block 630 may be configured to detect a panel brightness value and a ratio of light emitting pixels. The panel brightness value may correspond to a brightness value (for example, an overall brightness value or a local brightness value) of the display panel 110 as the plurality of pixels PXL (see FIG. 2) emit light based on the second image data DATA2. The ratio of pixels emitting light may refer to the ratio of the pixels PXL emitting light based on the second image data DATA2 among the plurality of pixels PXL. In some embodiments, the ratio of the pixels emitting light may refer to the ratio of the sub-pixels SP emitting light based on the second image data DATA2 among the plurality of sub-pixels SP (see FIG. 1). Hereinafter, for better understanding and ease of description, the panel brightness value will be described as an example referring to the overall brightness value of the display panel 110 as the plurality of pixels PXL emit light based on the second image data. In addition, for better understanding and ease of description, the ratio of the pixels emitting light will be described as an example referring to the ratio of the pixel PXL emitting light based on the second image data DATA2 among the plurality of pixels PXL. However, the embodiments of the present disclosure are not limited thereto. The panel brightness value and the ratio of the pixels emitting light will be illustratively described with reference to FIG. 13.

The real-time sensing block 640 is configured to perform or stop real-time sensing based on whether a pattern is detected in the pattern detecting block 620, a panel brightness value detected in the brightness detecting block 630, and a ratio of pixels emitting light. An embodiment in which the real-time sensing block 640 performs or stops real-time sensing will be illustratively described with reference to FIGS. 14 and 15.

Figure 7:
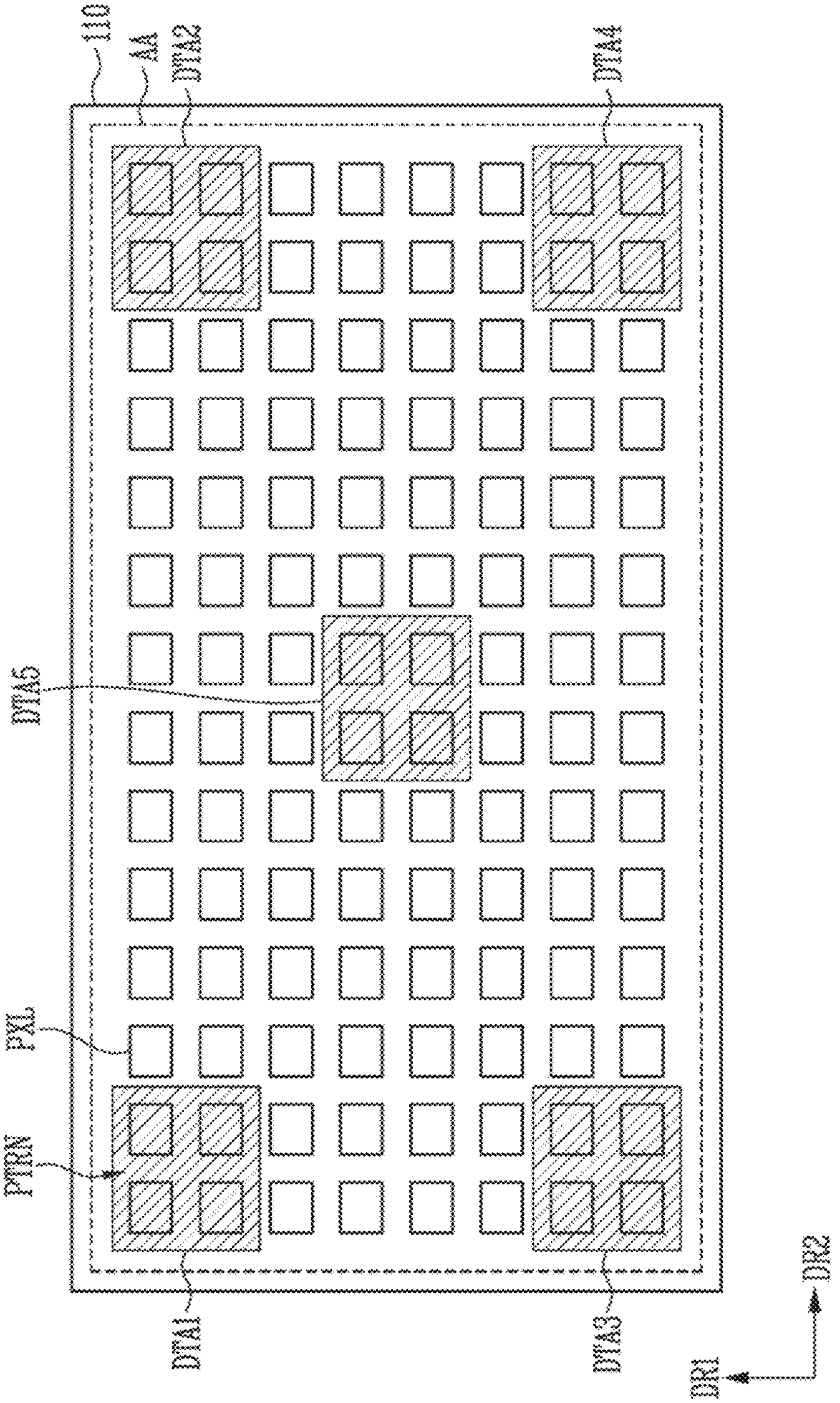
FIG. 7 illustrates an example of a detection area in a display device according to embodiments of the present disclosure.

FIG. 7 illustrates an example of a detection area DTA in the display device 100 (see FIG. 1) according to embodiments of the present disclosure.

The detection area DTA may be set as at least a partial area of the display panel 110. In some embodiments, the detection area DTA may be set as the entire display area AA. In some embodiments, the detection area DTA may be set to a portion of the display area AA. Hereinafter, an embodiment in which the detection area DTA is set as a portion of the display area AA will be described as an example, but embodiments of the present disclosure are not limited thereto.

The detection area DTA may overlap one or more pixels PXL. For example, the detection area DTA may overlap the plurality of pixels PXL.

In some embodiments, only one detection area DTA may be provided in the display area AA. In some embodiments, two or more detection areas DTA may be provided in the display area AA. Hereinafter, for better understanding and ease of description, an embodiment in which two or more detection area DTA are provided in the display area AA will be described as an example, but embodiments of the present disclosure are not limited thereto.

In some embodiments, at least some of the plurality of detection areas DTA may be disposed at an edge (for example, a vertex) area of the display area AA. In some embodiments, the remaining some of the plurality of detection areas DTA may be disposed in the central area of the display area AA.

Referring to FIG. 7, a first detection area DTA1, a second detection area DTA2, a third detection area DTA3, a fourth detection area DTA4, and a fifth detection area DTA5 may be set in the display area AA. The first to fourth detection areas DTA1 to DTA4 may be set to correspond to four vertices of the display area AA, respectively. For example, the first to fourth detection areas DTA1 to DTA4 may correspond to four corners of the display area AA. The fifth detection area DTA5 may be set to correspond to the center of the display area AA.

In some embodiments, respective sizes of the plurality of detection areas may all be the same. In some embodiments, at least one of the plurality of detection areas DTA may have a different size from the other detection areas DTA. The sizes of the first to fifth detection areas DTA1 to DTA5 may all be the same.

The shape of the detection area DTA may be variously set. Referring to FIG. 7, an embodiment in which all of the first to fifth detection areas DTA1 to DTA5 are set to have a square shape is illustrated. However, embodiments of the present disclosure are not limited thereto, and the first to fifth detection areas DTA1 to DTA5 may be set to have various shapes such as a rectangular shape, a circular shape, and a polygonal shape other than a quadrangular shape.

The above-described pattern detecting block 620 (see FIG. 6) may detect a pattern PTRN of an image displayed by the plurality of pixels PXL disposed overlapping the detection area DTA. The pattern detecting block 620 may compare the detected pattern PTRN with a preset pattern.

In the display area AA, at least one pixel displaying the pattern PTRN among the plurality of pixels PXL may alternately emit light or may not emit light according to the progress of the frame. For example, the processor (for example, the timing controller 140) may control at least one pixel displaying the pattern PTRN among the plurality of pixels PXL to alternate between emitting light and not emitting light according to the progress of the frame. Accordingly, a low grayscale image may be expressed in a more precise range.

Figure 8:
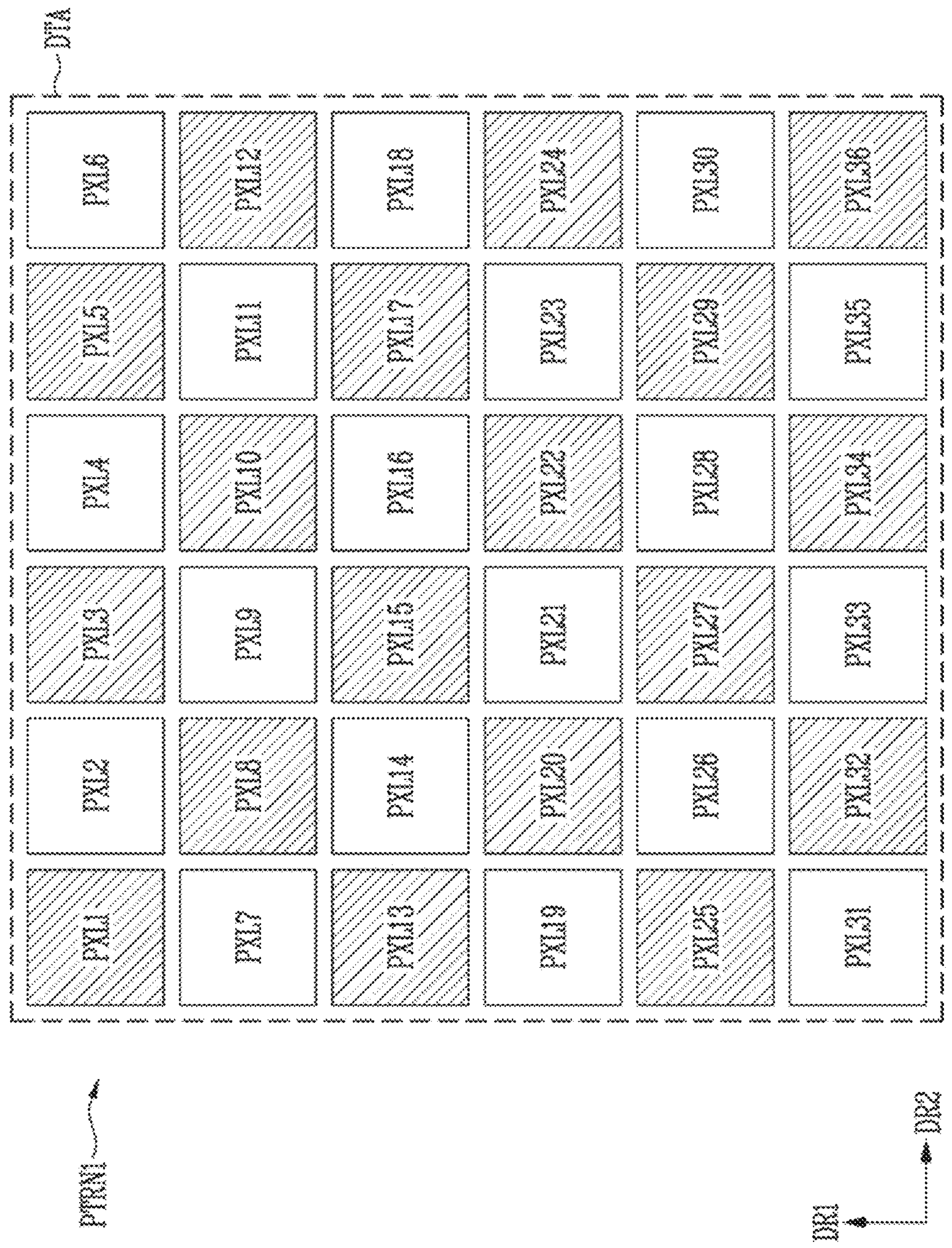
FIG. 8 illustrates an example of a first pattern in a display device according to embodiments of the present disclosure.

FIG. 8 illustrates an example of a first pattern PTRN1 in a display device according to embodiments of the present disclosure.

The pattern detecting block 620 (see FIG. 6) may determine whether the detected pattern PTRN (see FIG. 5) is the same as the first pattern PTRN1.

The first pattern PTRN1 may be a pattern in which a pixel that emits light and a pixel that does not emit light are repeated in one unit among the plurality of pixels PXL disposed in the detection area DTA.

Referring to FIG. 8, 36 pixels PXL disposed overlapping the detection area DTA are shown. 36 pixels PXL may be disposed in 6 rows and 6 columns. The row direction may be the second direction DR2. The column direction may be the first direction DR1.

The first, second, third, fourth, fifth and sixth pixels PXL1, PXL2, PXL3, PXL4, PXL5, and PXL6 may be disposed in the first row. The seventh, eighth, ninth, tenth and twelfth pixels PXL7, PXL8, PXL9, PXL10, PXL11, and PXL12 may be disposed in the second row. The thirteenth, fourteenth, fifteenth, sixteenth, seventeenth and eighteenth pixels PXL13, PXL14, PXL14, PXL15, PXL16, PXL17, and PXL18 may be disposed in the third row. The nineteenth, twentieth, twenty-first, twenty-second, twenty-third and twenty-fourth pixels PXL19, PXL20, PXL21, PXL22, PXL23, and PXL24 may be disposed in the fourth row. The twenty-fifth, twenty-sixth, twenty-seventh, twenty-eighth, twenty-ninth and thirtieth pixels PXL25, PXL26, PXL27, PXL28, PXL29, and PXL30 may be disposed in the fifth row. The thirty-first, thirty-second, thirty-third, thirty-fourth, thirty-fifth and thirty-sixth pixels PXL31, PXL32, PXL33, PXL34, PXL35, and PXL36 may be disposed in the sixth row.

The first pattern PTRN1 is described using the first and second rows as an example as follows.

The first pixel PXL1 may be a pixel that emits light. The second pixel PXL2 disposed adjacent to the first pixel PXL1 in the second direction DR2 may be a pixel that does not emit light. The third pixel PXL3 disposed adjacent to the second pixel PXL2 in the second direction DR2 may be a pixel that emits light. The fourth pixel PXL4 disposed adjacent to the third pixel PXL3 in the second direction DR2 may be a pixel that does not emit light. The fifth pixel PXL5 disposed adjacent to the fourth pixel PXL4 in the second direction DR2 may be a pixel that emits light. The sixth pixel PXL6 disposed adjacent to the fifth pixel PXL5 in the second direction DR2 may be a pixel that does not emit light.

The seventh pixel PXL7 disposed adjacent to the first pixel PXL1 in the first direction DR1 may be a pixel that does not emit light. The eighth pixel PXL8 disposed adjacent to the second pixel PXL2 in the first direction DR1 may be a pixel that emits light. The ninth pixel PXL9 disposed adjacent to the third pixel PXL3 in the first direction DR1 may be a pixel that does not emit light. The tenth pixel PXL10 disposed adjacent to the fourth pixel PXL4 in the first direction DR1 may be a pixel that emits light. The eleventh pixel PXL11 disposed adjacent to the fifth pixel PXL5 in the first direction DR1 may be a pixel that does not emit light. The twelfth pixel PXL12 disposed adjacent to the sixth pixel PXL6 in the first direction DR1 may be a pixel that emits light.

Furthermore, the pixels PXL13, PXL15, PXL17, PXL20, PXL22, PXL24, PXL25, PXL27, PXL29, PXL32, PXL34 and PXL36 may be pixels that emit light. The pixels PXL14, PXL16, PXL18, PXL19, PXL21, PXL23, PXL26, PXL28, PXL30, PXL31, PXL33 and PXL35 may be pixels that do not emit light.

According to the first pattern PTRN1 as described above, a pixel that emits light and a pixel that does not emit light may be repeated in one unit, among the plurality of pixels PXL disposed in the detection area DTA. Accordingly, the overall brightness of the detection area DTA may be half of the brightness of the pixels emitting light in the detection area DTA. Accordingly, a low grayscale image may be easily displayed in the detection area DTA.

The pattern detecting block 620 (see FIG. 6) may determine whether the detected pattern PTRN (see FIG. 5) is the same as the first pattern PTRN1. When the detected pattern PTRN is the same as the first pattern PTRN1, the low grayscale image may be displayed in the detection area DTA.

Figure 9:
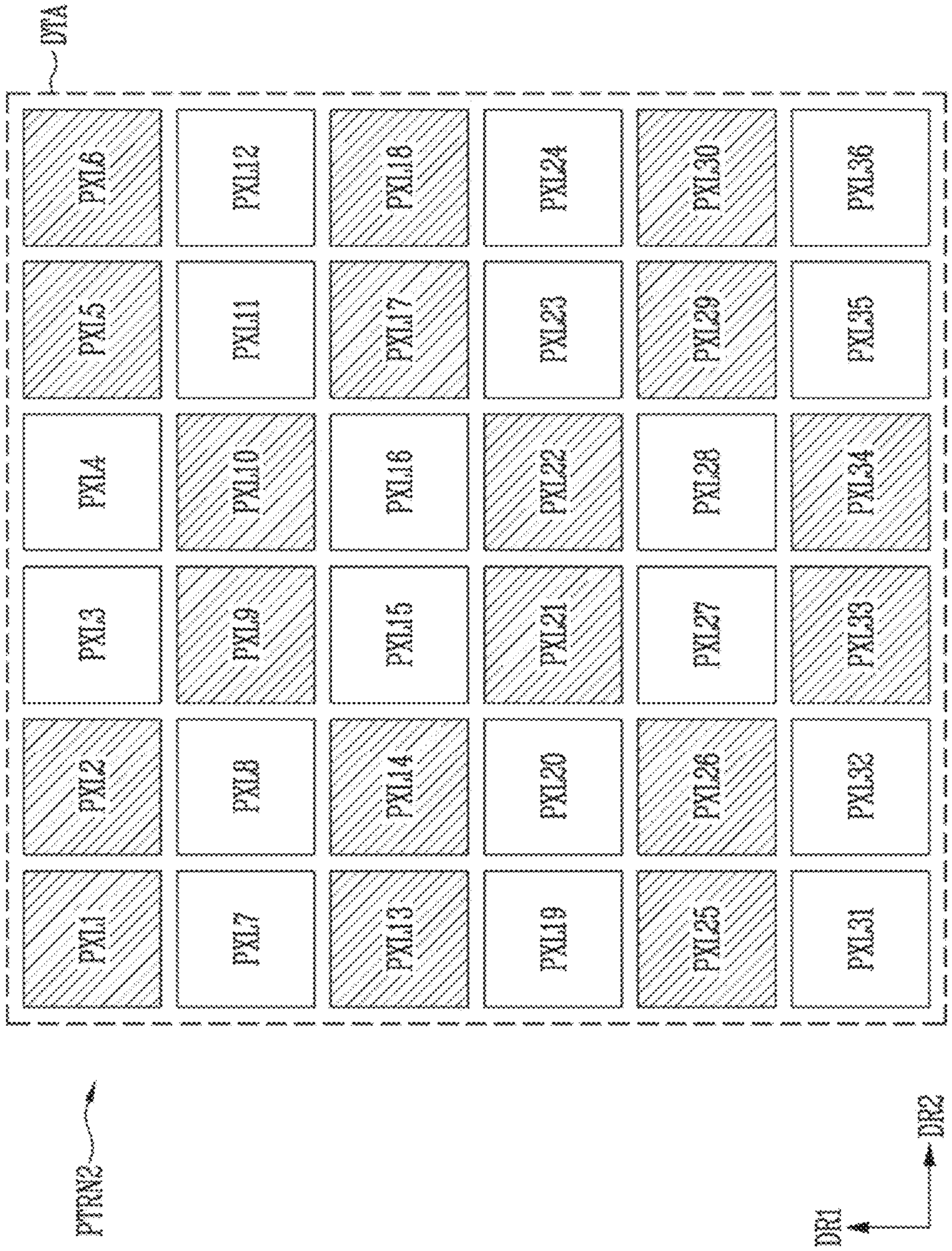
FIG. 9 illustrates an example of a second pattern in a display device according to embodiments of the present disclosure.

FIG. 9 illustrates an example of a second pattern PTRN2 in a display device according to embodiments of the present disclosure.

The second pattern PTRN2 may be a pattern in which a pixel that emits light and a pixel that does not emit light are repeated in multiple units among the plurality of pixels PXL disposed in the detection area DTA. Referring to FIG. 9, the second pattern PTRN2 may be a pattern in which a pixel that emits light and a pixel that does not emit light are repeated in two units among the plurality of pixels PXL disposed in the detection area DTA.

The layout of the first to thirty-sixth pixels PXL1 to PXL36 is the same as that of FIG. 8, so the description thereof is omitted.

The second pattern PTRN2 is described using the first and second rows as an example as follows.

The first pixel PXL1 may be a pixel that emits light. The second pixel PXL2 disposed adjacent to the first pixel PXL1 in the second direction DR2 may be a pixel that emits light. The third pixel PXL3 disposed adjacent to the second pixel PXL2 in the second direction DR2 may be a pixel that does not emit light. The fourth pixel PXL4 disposed adjacent to the third pixel PXL3 in the second direction DR2 may be a pixel that does not emit light. The fifth pixel PXL5 disposed adjacent to the fourth pixel PXL4 in the second direction DR2 may be a pixel that emits light. The sixth pixel PXL6 disposed adjacent to the fifth pixel PXL5 in the second direction DR2 may be a pixel that emits light.

The seventh pixel PXL7 disposed adjacent to the first pixel PXL1 in the first direction DR1 may be a pixel that does not emit light. The eighth pixel PXL8 disposed adjacent to the second pixel PXL2 in the first direction DR1 may be a pixel that does not emit light. The ninth pixel PXL9 disposed adjacent to the third pixel PXL3 in the first direction DR1 may be a pixel that emits light. The tenth pixel PXL10 disposed adjacent to the fourth pixel PXL4 in the first direction DR1 may be a pixel that emits light. The eleventh pixel PXL11 disposed adjacent to the fifth pixel PXL5 in the first direction DR1 may be a pixel that does not emit light. The twelfth pixel PXL12 disposed adjacent to the sixth pixel PXL6 in the first direction DR1 may be a pixel that does not emit light.

Furthermore, the pixels PXL13, PXL14, PXL17, PXL18, PXL21, PXL22, PXL25, PXL25, PXL26, PXL29, PXL30, PXL33 and PXL34 may be pixels that emit light. The pixels PXL15, PXL16, PXL19, PXL20, PXL23, PXL24, PXL27, PXL28, PXL31, PXL32, PXL35 and PXL36 may be pixels that do not emit light.

According to the second pattern PTRN2 as described above, a pixel that emits light and a pixel that does not emit light may be repeated in multiple units (for example, two units), among the plurality of pixels PXL disposed in the detection area DTA. Accordingly, the overall brightness of the detection area DTA may be half of the brightness of the pixels emitting light in the detection area DTA. Accordingly, a low grayscale image may be easily displayed in the detection area DTA.

The pattern detecting block 620 (see FIG. 6) may determine whether the detected pattern PTRN (see FIG. 5) is the same as the second pattern PTRN2. When the detected pattern PTRN is the same as the second pattern PTRN2, the low grayscale image may be displayed in the detection area DTA.

Figure 10:
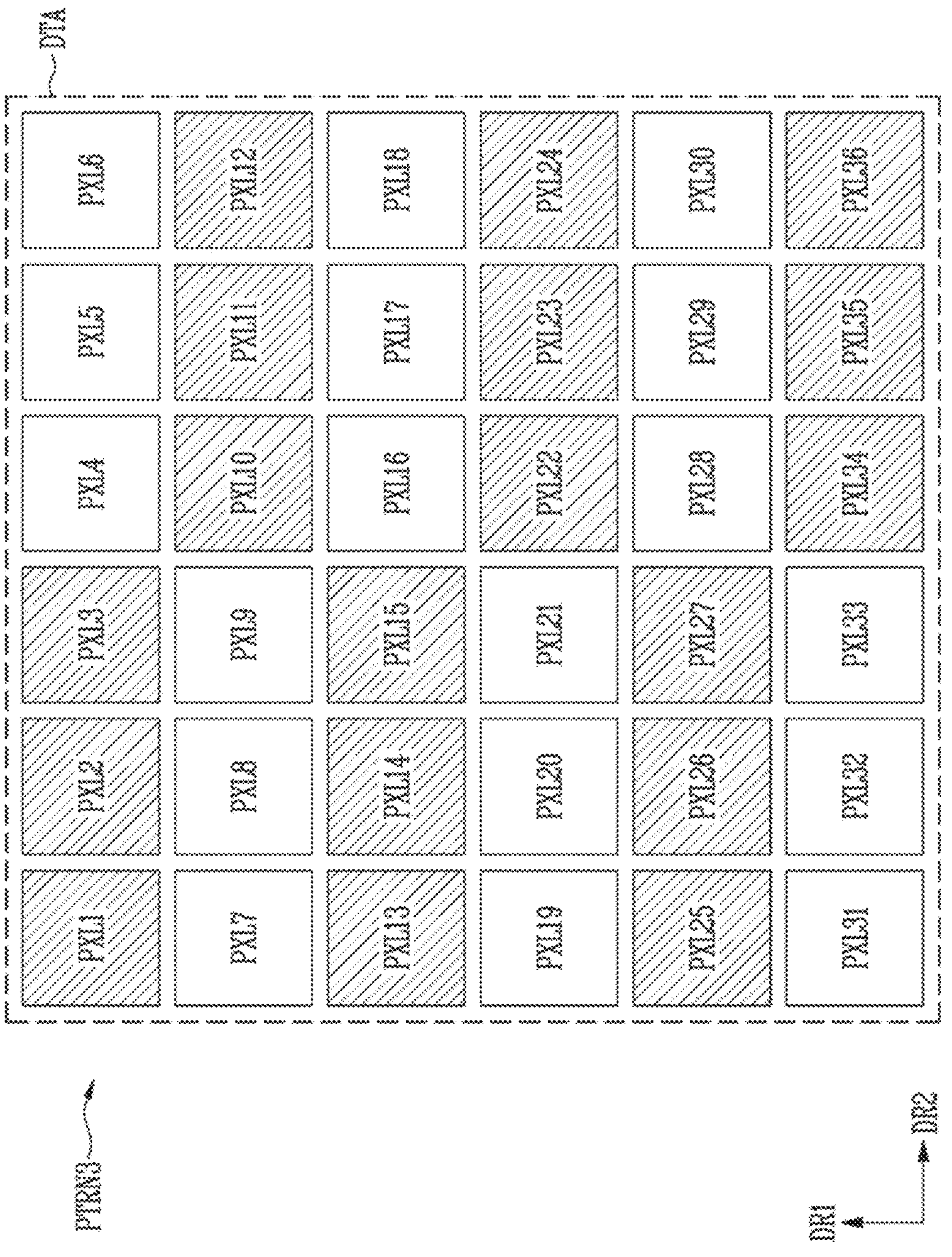
FIG. 10 illustrates an example of a third pattern in a display device according to embodiments of the present disclosure.

FIG. 10 illustrates an example of a third pattern PTRN3 in a display device according to embodiments of the present disclosure.

The third pattern PTRN3 may be a pattern in which a pixel that emits light and a pixel that does not emit light are repeated in multiple units among the plurality of pixels PXL disposed in the detection area DTA. Referring to FIG. 10, the third pattern PTRN3 may be a pattern in which a pixel that emits light and a pixel that does not emit light are repeated in three units among the plurality of pixels PXL disposed in the detection area DTA.

The layout of the first to thirty-sixth pixels PXL1 to PXL36 is the same as that of FIG. 8, so the description thereof is omitted.

The third pattern PTRN3 is described using the first and second rows as an example as follows.

The first pixel PXL1 may be a pixel that emits light. The second pixel PXL2 disposed adjacent to the first pixel PXL1 in the second direction DR2 may be a pixel that emits light. The third pixel PXL3 disposed adjacent to the second pixel PXL2 in the second direction DR2 may be a pixel that emits light. The fourth pixel PXL4 disposed adjacent to the third pixel PXL3 in the second direction DR2 may be a pixel that does not emit light. The fifth pixel PXL5 disposed adjacent to the fourth pixel PXL4 in the second direction DR2 may be a pixel that does not emit light. The sixth pixel PXL6 disposed adjacent to the fifth pixel PXL5 in the second direction DR2 may be a pixel that does not emit light.

The seventh pixel PXL7 disposed adjacent to the first pixel PXL1 in the first direction DR1 may be a pixel that does not emit light. The eighth pixel PXL8 disposed adjacent to the second pixel PXL2 in the first direction DR1 may be a pixel that does not emit light. The ninth pixel PXL9 disposed adjacent to the third pixel PXL3 in the first direction DR1 may be a pixel that does not emit light. The tenth pixel PXL10 disposed adjacent to the fourth pixel PXL4 in the first direction DR1 may be a pixel that emits light. The eleventh pixel PXL11 disposed adjacent to the fifth pixel PXL5 in the first direction DR1 may be a pixel that emits light. The twelfth pixel PXL12 disposed adjacent to the sixth pixel PXL6 in the first direction DR1 may be a pixel that emits light.

Furthermore, the pixels PXL13, PXL14, PXL15, PXL22, PXL23, PXL24, PXL25, PXL26, PXL27, PXL34, PXL35 and PXL36 may be pixels that emit light. The pixels PXL16, PXL17, PXL18, PXL19, PXL20, PXL21, PXL28, PXL29, PXL30, PXL31, PXL32 and PXL33 may be pixels that do not emit light.

According to the third pattern PTRN3 as described above, a pixel that emits light and a pixel that does not emit light may be repeated in multiple units (for example, three units), among the plurality of pixels PXL disposed in the detection area DTA. Accordingly, the overall brightness of the detection area DTA may be half of the brightness of the pixels emitting light in the detection area DTA. Accordingly, a low grayscale image may be easily displayed in the detection area DTA.

The pattern detecting block 620 (see FIG. 6) may determine whether the detected pattern PTRN (see FIG. 5) is the same as the third pattern PTRN3. When the detected pattern PTRN is the same as the third pattern PTRN3, the low grayscale image may be displayed in the detection area DTA.

Figure 11:
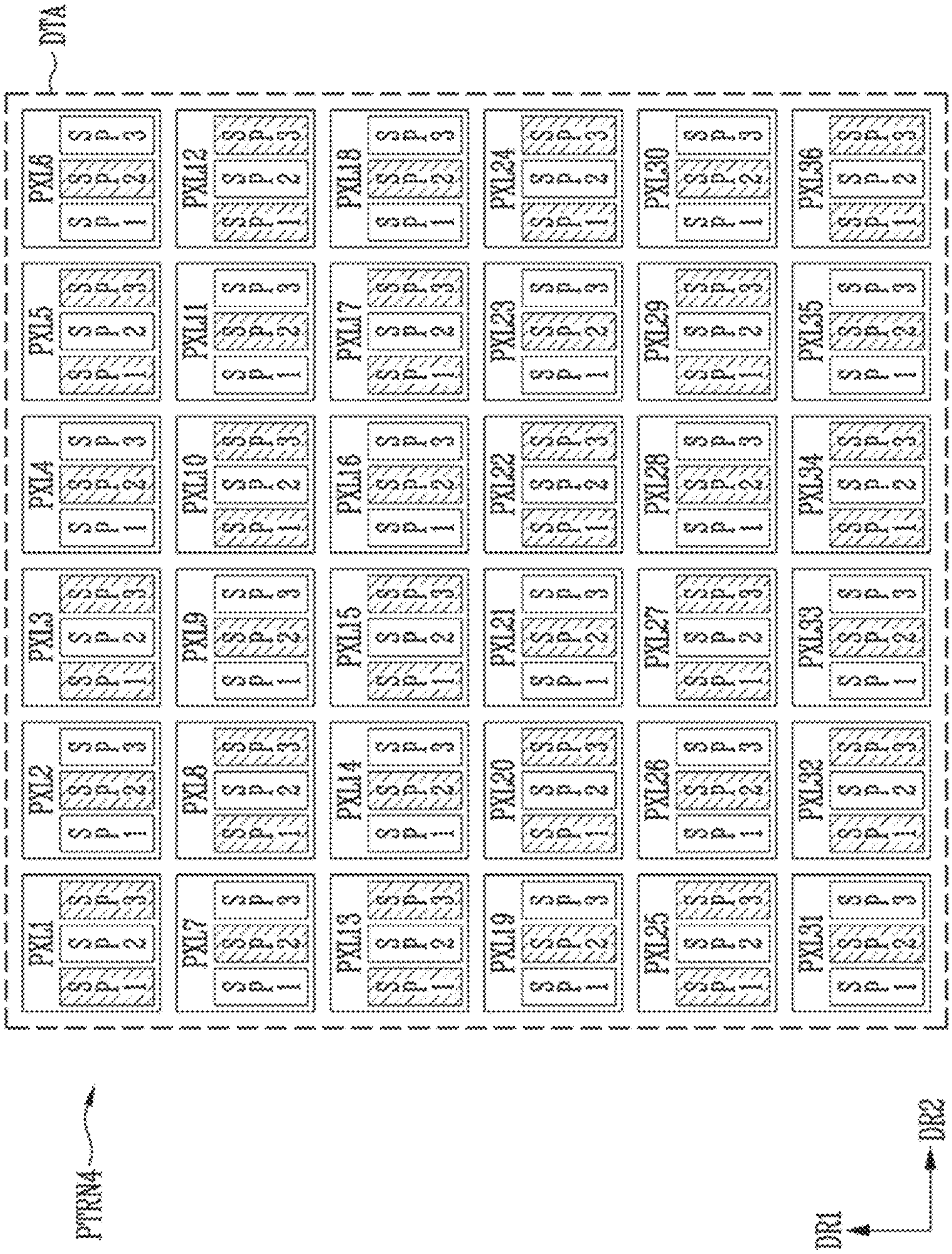
FIG. 11 illustrates an example of a fourth pattern in a display device according to embodiments of the present disclosure.

FIG. 11 illustrates an example of a fourth pattern PTRN4 in a display device according to embodiments of the present disclosure.

Referring to FIG. 11, 36 pixels PXL disposed overlapping the detection area DTA are shown. 36 pixels PXL may be disposed in 6 rows and 6 columns. The row direction may be the second direction DR2. The column direction may be the first direction DR1.

The layout of the first to thirty-sixth pixels PXL1 to PXL36 is the same as that of FIG. 8, so the description thereof is omitted.

Each of the first to thirty-sixth pixels (PXL1 to PXL36) disposed overlapping the detection area DTA may include a plurality of sub-pixels. Referring to FIG. 11, each of the first to thirty-sixth pixels PXL1 to PXL36 may include three sub-pixels SP1, SP2, and SP3. The three sub-pixels SP1, SP2, and SP3 may be disposed to be adjacent to each other in the second direction DR2.

The fourth pattern PTRN4 may be a pattern in which a sub-pixel that emits light and a sub-pixel that does not emit light are repeated in one unit among the plurality of sub-pixels SP disposed in the detection area DTA.

The fourth pattern PTRN4 is described using the first and second rows as an example as follows.

The first sub-pixel SP1, the second sub-pixel SP2, and the third sub-pixel SP3 of the first pixel PXL1 may be a sub-pixel that emits light, a sub-pixel that does not emit light, and a sub-pixel that emits light, respectively. The first sub-pixel SP1, the second sub-pixel SP2, and the third sub-pixel SP3 of the second pixel PXL2 may be a sub-pixel that does not emit light, a sub-pixel that emits light, and a sub-pixel that does not emit light, respectively. The first sub-pixel SP1, the second sub-pixel SP2, and the third sub-pixel SP3 of the third pixel PXL3 may be a sub-pixel that emits light, a sub-pixel that does not emit light, and a sub-pixel that emits light, respectively. The first sub-pixel SP1, the second sub-pixel SP2, and the third sub-pixel SP3 of the fourth pixel PXL4 may be a sub-pixel that does not emit light, a sub-pixel that emits light, and a sub-pixel that does not emit light, respectively. The first sub-pixel SP1, the second sub-pixel SP2, and the third sub-pixel SP3 of the fifth pixel PXL5 may be a sub-pixel that emits light, a sub-pixel that does not emit light, and a sub-pixel that emits light, respectively. The first sub-pixel SP1, the second sub-pixel SP2, and the third sub-pixel SP3 of the sixth pixel PXL6 may be a sub-pixel that does not emit light, a sub-pixel that emits light, and a sub-pixel that does not emit light, respectively.

The first sub-pixel SP1, the second sub-pixel SP2, and the third sub-pixel SP3 of the seventh pixel PXL7 may be a sub-pixel that does not emit light, a sub-pixel that emits light, and a sub-pixel that does not emit light, respectively. The first sub-pixel SP1, the second sub-pixel SP2, and the third sub-pixel SP3 of the eighth pixel PXL8 may be a sub-pixel that emits light, a sub-pixel that does not emit light, and a sub-pixel that emits light, respectively. The first sub-pixel SP1, the second sub-pixel SP2, and the third sub-pixel SP3 of the ninth pixel PXL9 may be a sub-pixel that does not emit light, a sub-pixel that emits light, and a sub-pixel that does not emit light, respectively. The first sub-pixel SP1, the second sub-pixel SP2, and the third sub-pixel SP3 of the tenth pixel PXL10 may be a sub-pixel that emits light, a sub-pixel that does not emit light, and a sub-pixel that emits light, respectively. The first sub-pixel SP1, the second sub-pixel SP2, and the third sub-pixel SP3 of the eleventh pixel PXL11 may be a sub-pixel that does not emit light, a sub-pixel that emits light, and a sub-pixel that does not emit light, respectively. The first sub-pixel SP1, the second sub-pixel SP2, and the third sub-pixel SP3 of the twelfth pixel PXL12 may be a sub-pixel that emits light, a sub-pixel that does not emit light, and a sub-pixel that emits light, respectively.

The pixels of the third and fifth rows may correspond to the pixels of the first row, and the pixels of the fourth and sixth rows may correspond to the pixels of the second row.

According to the fourth pattern PTRN4 as described above, a sub-pixel that emits light and a sub-pixel that does not emit light may be repeated in one unit, among the plurality of sub-pixels SP disposed in the detection area DTA. Accordingly, the overall brightness of the detection area DTA may be half of the brightness of the sub-pixels emitting light in the detection area DTA. Accordingly, a low grayscale image may be easily displayed in the detection area DTA.

The pattern detecting block 620 (see FIG. 6) may determine whether the detected pattern PTRN (see FIG. 5) is the same as the fourth pattern PTRN4. When the detected pattern PTRN is the same as the fourth pattern PTRN4, the low grayscale image may be displayed in the detection area DTA.

Figure 12:
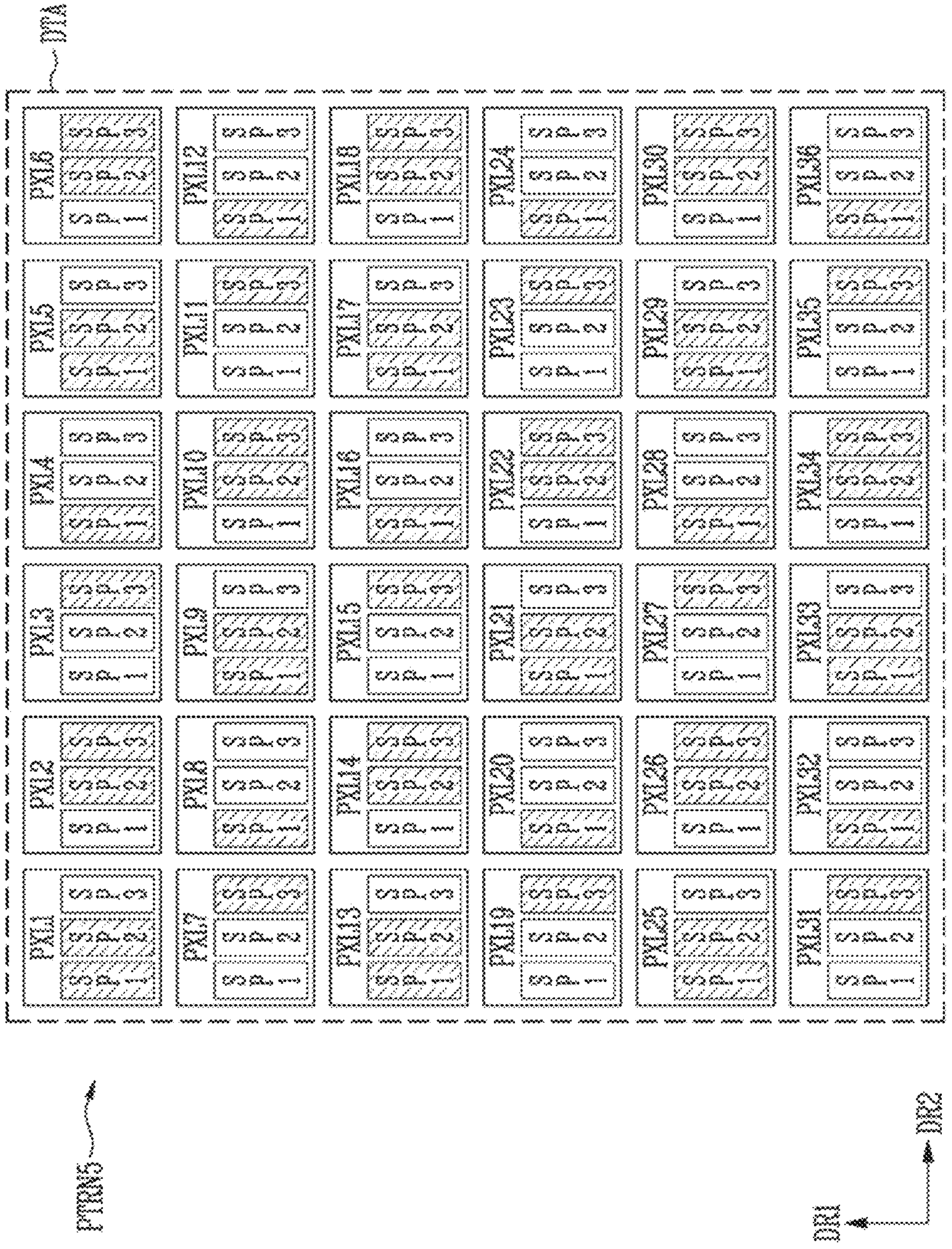
FIG. 12 illustrates an example of a fifth pattern in a display device according to embodiments of the present disclosure.

FIG. 12 illustrates an example of a fifth pattern PTRN5 in a display device according to embodiments of the present disclosure.

The layout of the first to thirty-sixth pixels PXL1 to PXL36 is the same as that of FIG. 8, so the description thereof is omitted. The layout of the first to third sub-pixels SP1 to SP3 is the same as that of FIG. 11, so the description thereof is omitted.

The fifth pattern PTRN5 may be a pattern in which a sub-pixel that emits light and a sub-pixel that does not emit light are repeated in multiple units (for example, two units) among the plurality of sub-pixels SP disposed in the detection area DTA.

The fifth pattern PTRN5 is described using the first and second rows as an example as follows.

The first sub-pixel SP1, the second sub-pixel SP2, and the third sub-pixel SP3 of the first pixel PXL1 may be a sub-pixel that emits light, a sub-pixel that emits light, and a sub-pixel that does not emit light, respectively. The first sub-pixel SP1, the second sub-pixel SP2, and the third sub-pixel SP3 of the second pixel PXL2 may be a sub-pixel that does not emit light, a sub-pixel that emits light, and a sub-pixel that emits light, respectively. The first sub-pixel SP1, the second sub-pixel SP2, and the third sub-pixel SP3 of the third pixel PXL3 may be a sub-pixel that does not emit light, a sub-pixel that does not emit light, and a sub-pixel that emits light, respectively. The first sub-pixel SP1, the second sub-pixel SP2, and the third sub-pixel SP3 of the fourth pixel PXL4 may be a sub-pixel that emits light, a sub-pixel that does not emit light, and a sub-pixel that does not emit light, respectively. The first sub-pixel SP1, the second sub-pixel SP2, and the third sub-pixel SP3 of the fifth pixel PXL5 may be a sub-pixel that emits light, a sub-pixel that emits light, and a sub-pixel that does not emit light, respectively. The first sub-pixel SP1, the second sub-pixel SP2, and the third sub-pixel SP3 of the sixth pixel PXL6 may be a sub-pixel that does not emit light, a sub-pixel that emits light, and a sub-pixel that emits light, respectively.

The first sub-pixel SP1, the second sub-pixel SP2, and the third sub-pixel SP3 of the seventh pixel PXL7 may be a sub-pixel that does not emit light, a sub-pixel that does not emit light, and a sub-pixel that emits light, respectively. The first sub-pixel SP1, the second sub-pixel SP2, and the third sub-pixel SP3 of the eighth pixel PXL8 may be a sub-pixel that emits light, a sub-pixel that does not emit light, and a sub-pixel that does not emit light, respectively. The first sub-pixel SP1, the second sub-pixel SP2, and the third sub-pixel SP3 of the ninth pixel PXL9 may be a sub-pixel that emits light, a sub-pixel that emits light, and a sub-pixel that does not emit light, respectively. The first sub-pixel SP1, the second sub-pixel SP2, and the third sub-pixel SP3 of the tenth pixel PXL10 may be a sub-pixel that does not emit light, a sub-pixel that emits light, and a sub-pixel that emits light, respectively. The first sub-pixel SP1, the second sub-pixel SP2, and the third sub-pixel SP3 of the eleventh pixel PXL11 may be a sub-pixel that does not emit light, a sub-pixel that does not emit light, and a sub-pixel that emits light, respectively. The first sub-pixel SP1, the second sub-pixel SP2, and the third sub-pixel SP3 of the twelfth pixel PXL12 may be a sub-pixel that emits light, a sub-pixel that does not emit light, and a sub-pixel that does not emit light, respectively.

The pixels of the third and fifth rows may correspond to the pixels of the first row, and the pixels of the fourth and sixth rows may correspond to the pixels of the second row.

According to the fifth pattern PTRN5 as described above, a sub-pixel that emits light and a sub-pixel that does not emit light may be repeated in multiple units (for example, two units), among the plurality of sub-pixels SP disposed in the detection area DTA. Accordingly, the overall brightness of the detection area DTA may be half of the brightness of the sub-pixels emitting light in the detection area DTA. Accordingly, a low grayscale image may be easily displayed in the detection area DTA.

The pattern detecting block 620 (see FIG. 6) may determine whether the detected pattern PTRN (see FIG. 5) is the same as the fifth pattern PTRN5. When the detected pattern PTRN is the same as the fifth pattern PTRN5, the low grayscale image may be displayed in the detection area DTA.

Figure 13:
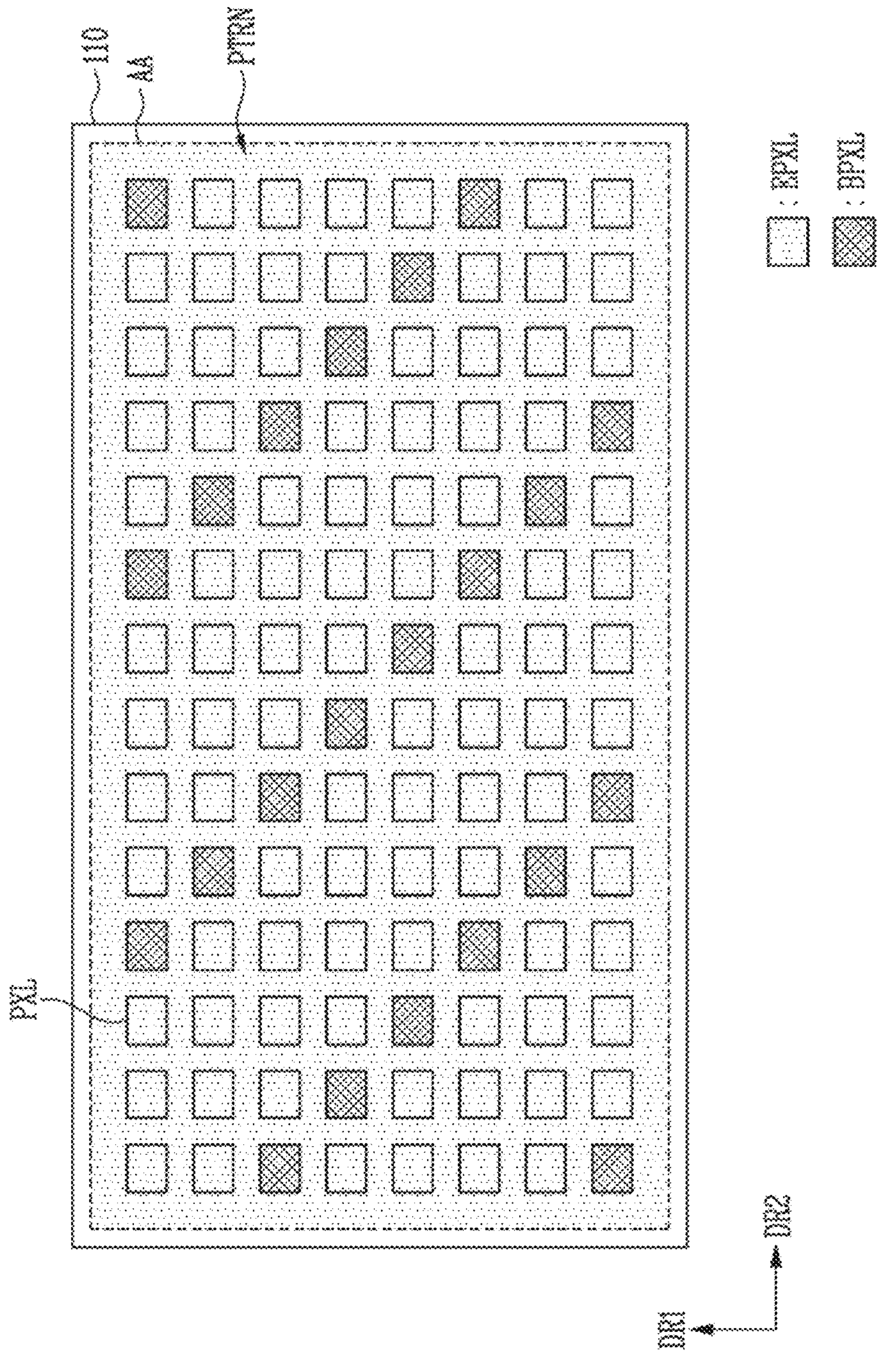
FIG. 13 is a drawing for explaining panel brightness values in a display device according to embodiments of the present disclosure.

FIG. 13 is a drawing for describing a panel brightness value PBV in the display device 100 (see FIG. 1) according to the embodiments of the present disclosure.

Referring to FIG. 13, the panel brightness value PBV may indicate the overall brightness of the display panel 110. For example, the panel brightness value PBV may range from 0 to 255. In the above embodiment, when the panel brightness value PBV is 0, it may indicate that an image of 0 grayscale is displayed on the entire display panel 110. The image of 0 grayscale may be a black image in which all pixels PXL disposed on the display panel 110 do not emit light. In the above embodiment, when the panel brightness value PBV is 255, it may indicate that an image of 255 grayscale is displayed on the entire display panel 110. The image of 255 grayscale may be a full-white image in which all pixels PXL disposed on the display panel 110 emit light at a maximum grayscale. When the panel brightness value PBV is low, it may be understood that a low grayscale image is displayed on the entire display panel 110. When the panel brightness value PBV is high, it may be understood that a high grayscale image is displayed on the entire display panel 110.

The low grayscale image, for example, may refer to an image with the panel brightness value PBV between 1 and 23 (or between 1 and 23 grayscales). In some embodiments, the low grayscale image may include an image with the panel brightness value PBV between 0 and 1 (or between 0 and 1 grayscales). However, embodiments of the present disclosure are not limited thereto.

Referring to FIG. 13, the plurality of pixels PXL disposed on the display panel 110 may be divided into light emitting pixels EPXL that emit light and non-light emitting pixels BPXL that do not emit light. When the panel brightness value PBV is low, the light emitting pixels EPXL emit light with a relatively high brightness, and by disposing the non-light emitting pixels BPXL between the light emitting pixels EPXL, a low grayscale image may be displayed in the display area AA. The ratio of pixels emitting light may be calculated by dividing the number of the light emitting pixels EPXL by the number of the plurality of pixels PXL disposed in the display area AA. In some embodiments, the ratio of pixels emitting light may be replaced by the ratio of sub-pixels emitting light. For example, to detect the first to third patterns PTRN1 to PTRN3 (see FIGS. 8 to 10) described above, the ratio of pixels emitting light may be used. For example, to detect the fourth and fifth patterns PTRN4 and PTRN5 (see FIGS. 9 and 10) described above, the ratio of sub-pixels emitting light may be used. Referring to FIG. 13, the ratio of pixels emitting light may be about 80%.

For example, when real-time sensing is performed while a low grayscale image is displayed in the display area AA, the corresponding pixel row may be displayed as a dark line. This may cause horizontal lines to be visible. To improve display quality, the real-time sensing may be stopped while a low grayscale image is displayed, and the real-time sensing may be performed while a high grayscale image is displayed.

Figure 14:
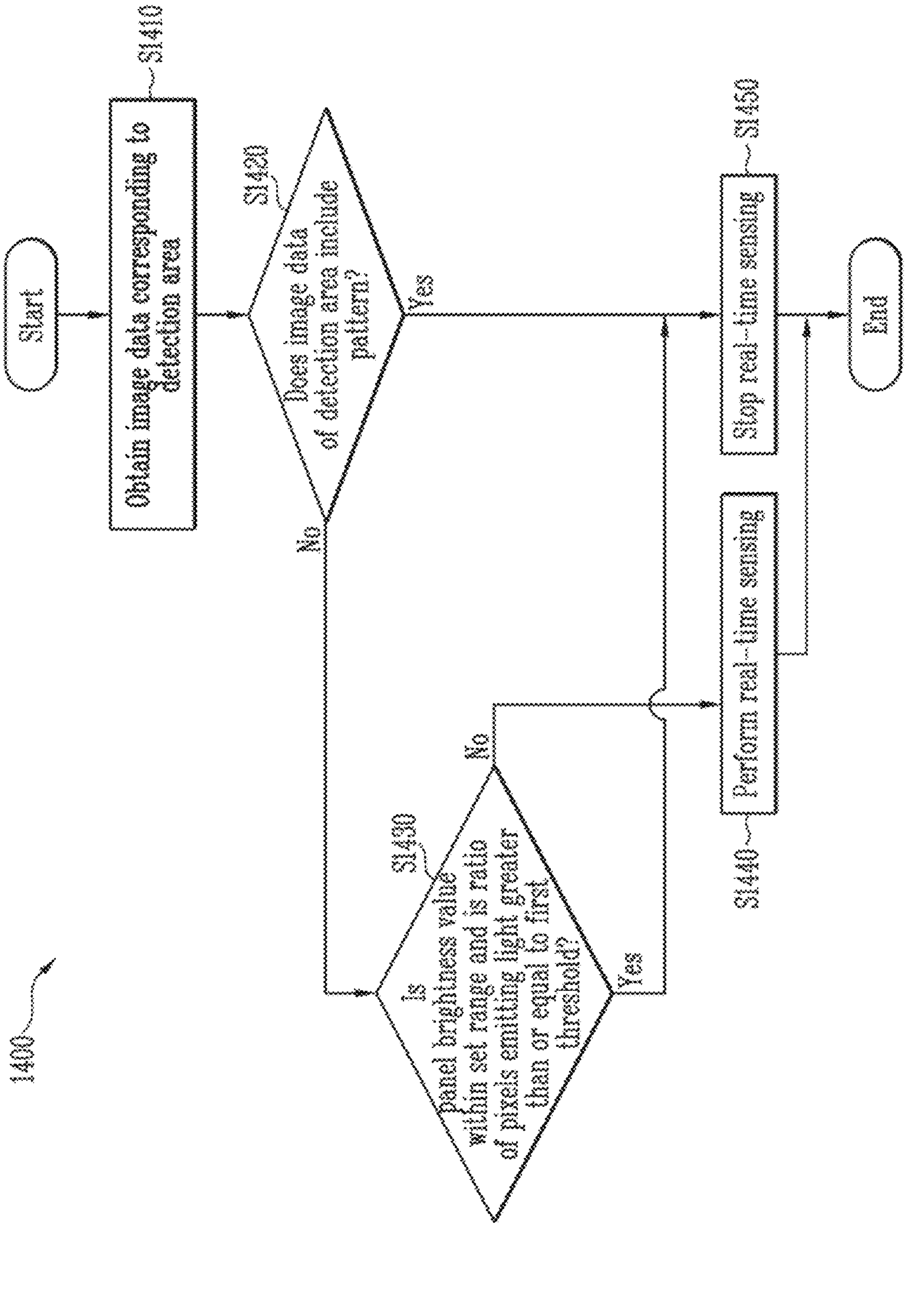
FIG. 14 illustrates an example of a flowchart of a driving method of a display device according to embodiments of the present disclosure.

FIG. 14 illustrates an example of a flowchart of a driving method 1400 of a display device according to embodiments of the present disclosure.

Referring to FIG. 14, the driving method 1400 of the display device according to the embodiments of the present disclosure may include obtaining image data corresponding to the detection area (S1410), determining whether the image data of the detection area includes a pattern (S1420), determining whether a panel brightness value is within a set range and if a ratio of pixels emitting light is greater than or equal to a first threshold (S1430), performing real-time sensing (S1440), and stopping the real-time sensing (S1450).

In the obtaining of the image data corresponding to the detection area (S1410), the pattern detecting block 620 (see FIG. 6) may obtain the image data of the detection area DTA (see FIG. 7). The obtained image data may be one of the first image data DATA1 (see FIG. 6) and the second image data DATA2.

In the determining whether the image data of the detection area includes the pattern (S1420), the pattern detecting block 620 (see FIG. 6) may detect the pattern PTRN in the image data. The pattern detecting block 620 may determine whether the detected pattern PTRN corresponds to a set pattern (for example, the preset first to fifth patterns PTRN1 to PTRN5).

When it is determined that the image data of the detection area includes the pattern, the stopping of the real-time sensing (S1450) may be performed. In other words, the real-time sensing block 640 (see FIG. 6) may stop the real-time sensing. Accordingly, when it is determined that a low grayscale image is displayed, the real-time sensing is stopped to prevent a horizontal line from becoming visualized.

When it is determined that the image data of the detection area does not include the pattern, the determining whether the panel brightness value is within the set range and if the ratio of pixels emitting light is greater than or equal to the first threshold (S1430) may be performed. In the determining whether the panel brightness value is within the set range and if the ratio of pixels emitting light is greater than or equal to the first threshold (S1430), the brightness detecting block 630 (see FIG. 6) may detect the panel brightness value PBV and the ratio of pixels emitting light.

The set range may be, for example, 1 to 23. The first threshold may be, for example, 90%.

When the detected panel brightness value PBV is within a set range and the ratio of the pixels emitting light is greater than or equal to the first threshold, the stopping of the real-time sensing (S1450) may be performed. The real-time sensing block 640 (see FIG. 6) may stop the real-time sensing. Accordingly, by stopping the real-time sensing while a low grayscale image is displayed, a horizontal line can be prevented from being viewed.

When the detected panel brightness value PBV is outside the set range or the ratio of the pixels emitting light is less than the first threshold, the performing of the real-time sensing (S1440) may be performed. The real-time sensing block 640 (see FIG. 6) may perform the real-time sensing. Accordingly, display quality may be improved by performing real-time sensing while a high grayscale image is displayed.

Figure 15:
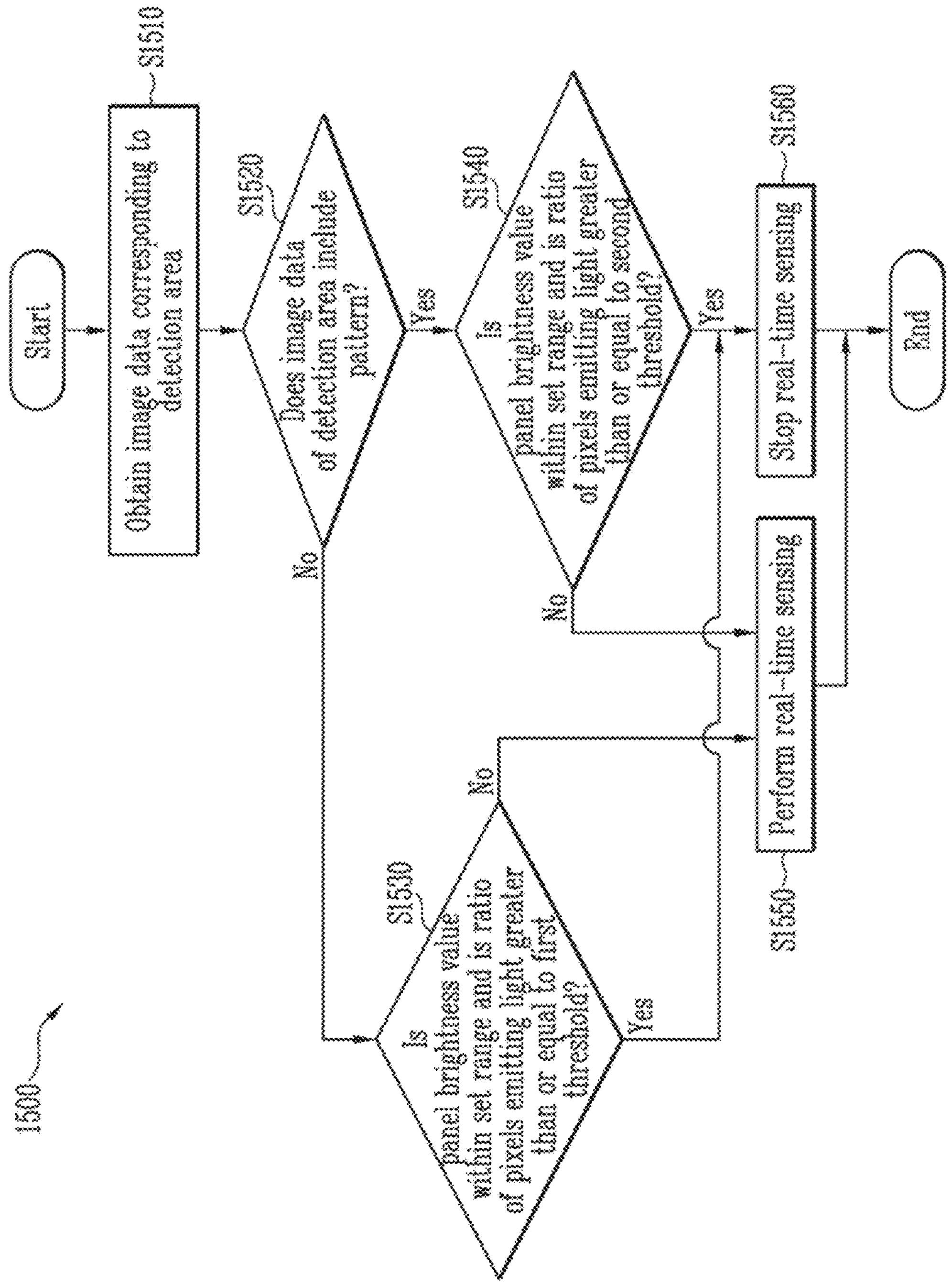
FIG. 15 illustrates another example of a flowchart of a driving method of a display device according to embodiments of the present disclosure.

FIG. 15 illustrates another example of a flowchart of a driving method 1500 of a display device according to embodiments of the present disclosure.

Referring to FIG. 15, the driving method 1500 of the display device according to the embodiments of the present disclosure may include obtaining image data corresponding to the detection area (S1510), determining whether the image data of the detection area includes a pattern (S1520), determining whether a panel brightness value is within a set range and if a ratio of pixels emitting light is greater than or equal to a first threshold (S1530), determining whether a panel brightness value is within the set range and if the ratio of pixels emitting light is greater than or equal to a second threshold (S1540), performing real-time sensing (S1550), and stopping the real-time sensing (S1560).

In the obtaining of the image data corresponding to the detection area (S1510), the pattern detecting block 620 (see FIG. 6) may obtain the image data of the detection area DTA (see FIG. 7). The obtained image data may be one of the first image data DATA1 (see FIG. 6) and the second image data DATA2.

In the determining whether the image data of the detection area includes the pattern (S1520), the pattern detecting block 620 (see FIG. 6) may detect the pattern PTRN in the image data. The pattern detecting block 620 may determine whether the detected pattern PTRN corresponds to a set pattern (for example, the preset first to fifth patterns PTRN1 to PTRN5).

When it is determined that the image data of the detection area does not include the pattern, the determining whether the panel brightness value is within the set range and if the ratio of pixels emitting light is greater than or equal to the first threshold (S1530) may be performed. In the determining whether the panel brightness value is within the set range and if the ratio of pixels emitting light is greater than or equal to the first threshold (S1530), the brightness detecting block 630 (see FIG. 6) may detect the panel brightness value PBV and the ratio of pixels emitting light.

The set range may be, for example, 1 to 23. The first threshold may be, for example, 90%.

When the detected panel brightness value PBV is within a set range and the ratio of the pixels emitting light is greater than or equal to the first threshold, the stopping of the real-time sensing (S1560) may be performed. The real-time sensing block 640 (see FIG. 6) may stop the real-time sensing. Accordingly, while a low grayscale image is displayed, by stopping the real-time sensing, it is possible to prevent a horizontal line from being viewed.

When the detected panel brightness value PBV is outside the first range or the ratio of the pixels emitting light is less than the first threshold, the performing of the real-time sensing (S1550) may be performed. The real-time sensing block 640 (see FIG. 6) may perform the real-time sensing. Accordingly, display quality may be improved by performing real-time sensing while a high grayscale image is displayed.

When it is determined that the image data of the detection area includes the pattern, the determining whether the panel brightness value is within the set range and if the ratio of pixels emitting light is greater than or equal to the second threshold (S1540) may be performed. The second threshold may be different from the first threshold. For example, the second threshold may be smaller than the first threshold. In the determining whether the panel brightness value is within the set range and if the ratio of pixels emitting light is greater than or equal to the second threshold (S1540), the brightness detecting block 630 (see FIG. 6) may detect the panel brightness value PBV and the ratio of pixels emitting light.

The set range may be, for example, 1 to 23. The second threshold may be a value smaller than the ratio of pixels emitting light in the first to third patterns PTRN1 to PTRN3 described above. The second threshold may be a value smaller than the ratio of sub-pixels emitting light in the fourth and fifth patterns PTRN4 and PTRN5 described above. The second threshold may be, for example, 49%.

When the detected panel brightness value PBV is within a set range and the ratio of the pixels emitting light is greater than or equal to a second threshold, step S1560 of stopping real-time sensing may be performed. The real-time sensing block 640 (see FIG. 6) may stop the real-time sensing. Accordingly, while a low grayscale image is displayed, by stopping the real-time sensing, it is possible to prevent a horizontal line from being viewed.

When the detected panel brightness value PBV is outside the set range or the ratio of the pixels emitting light is less than the second threshold, the performing of the real-time sensing (S1550) may be performed. The real-time sensing block 640 (see FIG. 6) may perform the real-time sensing. Accordingly, display quality may be improved by performing real-time sensing while a high grayscale image is displayed.

While this disclosure has been described in connection with what is presently considered to be example embodiments, it is to be understood that the disclosure is not limited to the disclosed embodiments, but, on the contrary, is intended to cover various modifications and equivalent arrangements included within the spirit and scope of the appended claims.

According to the processor, the display device including the same, and the method for driving the same according to the embodiments of the present disclosure, it is possible to prevent a horizontal line from becoming visible.

What is claimed is:

1. A processor comprising:

an interface circuit configured to receive first image data and convert the first image data into second image data;

a pattern detecting circuit configured to detect a pattern in the first image data or the second image data;

a brightness detecting circuit configured to detect a panel brightness value, which is a brightness value at which a plurality of pixels emit light in response to the second image data, and to detect a ratio of pixels emitting light among the plurality of pixels in response to the second image data; and a real-time sensing circuit, wherein when the pattern is not detected, the real-time sensing circuit performs or stops real-time sensing of the plurality of pixels based on whether the panel brightness value is within a set range and the ratio of the pixels emitting light is greater than or equal to a first threshold; and when the pattern is detected, the real-time sensing circuit performs or stops the real-time sensing of the plurality of pixels based on whether the panel brightness value is within the set range and the ratio of the pixels emitting light is greater than or equal to a second threshold.

2. The processor of claim 1, wherein the real-time sensing circuit, when the pattern is not detected, stops the real-time sensing of the plurality of pixels when the panel brightness value is within the set range and the ratio of the pixels emitting light is greater than or equal to the first threshold, and performs the real-time sensing of the plurality of pixels when the panel brightness value is outside the set range or the ratio of the pixels emitting light is less than the first threshold.

3. The processor of claim 1, wherein the real-time sensing circuit, when the pattern is detected, stops the real-time sensing of the plurality of pixels when the panel brightness value is within the set range and the ratio of the pixels emitting light is greater than or equal to the second threshold, and performs the real-time sensing of the plurality of pixels when the panel brightness value is outside the set range or the ratio of the pixels emitting light is less than the second threshold.

4. The processor of claim 1, wherein the first threshold is greater than the second threshold.

5. The processor of claim 1, wherein at least one pixel displaying the pattern among the plurality of pixels is controlled to alternate between emitting light and not emitting light as a frame progresses.

6. A processor comprising:

an interface circuit configured to receive first image data and convert the first image data into second image data;

a pattern detecting circuit configured to detect a pattern in the first image data or the second image data;

a brightness detecting circuit configured to detect a panel brightness value, which is a brightness value at which a plurality of pixels emit light in response to the second image data, and to detect a ratio of pixels emitting light among the plurality of pixels in response to the second image data; and a real-time sensing circuit, wherein when the pattern is not detected, the real-time sensing circuit performs or stops real-time sensing of the plurality of pixels based on whether the panel brightness value is within a set range and the ratio of the pixels emitting light is greater than or equal to a set threshold; and when the pattern is detected, the real-time sensing circuit stops the real-time sensing of the plurality of pixels.

7. The processor of claim 6, wherein the real-time sensing circuit stops the real-time sensing of the plurality of pixels when the panel brightness value is within the set range and the ratio of the pixels emitting light is greater than or equal to the set threshold, and performs the real-time sensing of the plurality of pixels when the panel brightness value is outside the set range or the ratio of the pixels emitting light is less than the set threshold.

8. A display device comprising:

a display panel including a plurality of pixels, a plurality of data lines electrically connected to the plurality of pixels, and a plurality of reference voltage lines electrically connected to the plurality of pixels;

an output circuit configured to supply a data voltage to the plurality of data lines;

a sensing circuit configured to sense the plurality of pixels through the plurality of reference voltage lines; and a timing controller configured to control driving timing of the output circuit and the sensing circuit, wherein the timing controller receives first image data and converts the first image data into second image data to be inputted to the output circuit;

detects a pattern in the first image data or the second image data;

detects a panel brightness value, which is a brightness value at which a plurality of pixels emit light in response to the second image data, and detects a ratio of pixels emitting light among the plurality of pixels in response to the second image data;

performs or stops real-time sensing of the plurality of pixels based on whether the panel brightness value is within a set range and the ratio of the pixels emitting light is greater than or equal to a set first threshold, when the pattern is not detected; and performs or stops the real-time sensing of the plurality of pixels based on whether the panel brightness value is within the set range and the ratio of the pixels emitting light is greater than or equal to a second threshold that is smaller than the first threshold, when the pattern is detected.

9. The display device of claim 8, wherein the timing controller, when the pattern is not detected, stops the real-time sensing of the plurality of pixels when the panel brightness value is within the set range and the ratio of the pixels emitting light is greater than or equal to the first threshold, and performs the real-time sensing of the plurality of pixels when the panel brightness value is outside the set range or the ratio of the pixels emitting light is less than the first threshold.

10. The display device of claim 8, wherein the timing controller, when the pattern is detected, stops the real-time sensing of the plurality of pixels when the panel brightness value is within the set range and the ratio of the pixels emitting light is greater than or equal to the second threshold, and performs the real-time sensing of the plurality of pixels when the panel brightness value is outside the set range or the ratio of the pixels emitting light is less than the second threshold.

11. The display device of claim 8, wherein the pattern is a pattern in which a pixel that emits light and a pixel that does not emit light are repeated in one unit among the plurality of pixels.

12. The display device of claim 8, wherein the pattern is a pattern in which a pixel that emits light and a pixel that does not emit light are repeated in two or more units among the plurality of pixels.

13. The display device of claim 8, wherein each of the plurality of pixels includes a plurality of sub-pixels, and the pattern is a pattern in which a sub-pixel that emits light and a sub-pixel that does not emit light are repeated in one unit among the plurality of sub-pixels.

14. The display device of claim 8, wherein each of the plurality of pixels includes a plurality of sub-pixels, and the pattern is a pattern in which a sub-pixel that emits light and a sub-pixel that does not emit light are repeated in two or more units among the plurality of sub-pixels.

15. The display device of claim 8, wherein the timing controller detects the pattern in pixels disposed in a predetermined area among the plurality of pixels.

16. The display device of claim 8, wherein a plurality of first and second scan lines that are electrically connected to the plurality of pixels are further included in the display panel;

the display device further includes a scan driving circuit configured to supply a first scan signal to the plurality of first scan lines and a second scan signal to the plurality of second scan lines;

each of the plurality of pixels includes at least one pixel circuit; and the pixel circuit further includes a first transistor including a gate electrode electrically connected to a first node, a first electrode electrically connected to a first power supply line, and a second electrode electrically connected to a second node;

a second transistor configured to switch an electrical connection between the first node and a corresponding one of the plurality of data lines in response to the first scan signal;

a third transistor configured to switch an electrical connection between the second node and a corresponding one of the plurality of reference voltage lines in response to the second scan signal; and a storage capacitor including a first electrode connected to the first node and a second electrode connected to the second node.

17. The display device of claim 16, wherein the timing controller, while performing the real-time sensing of one of the plurality of pixels, calculates a voltage increase per unit time of the reference voltage line during a period in which the second scan signal at a turn-on level is inputted to the second transistor.

18. A driving method of a display device including a processor, comprising:

receiving first image data and converting the first image data into second image data;

detecting a pattern in the first image data or the second image data; and detecting a panel brightness value, which is a brightness value at which a plurality of pixels emit light in response to the second image data, and detecting a ratio of pixels emitting light among the plurality of pixels in response to the second image data, determining, when the pattern is not detected, whether the panel brightness value is within a set range and the ratio of the pixels emitting light is greater than or equal to a first threshold, and determining, when the pattern is detected, whether the panel brightness value is within the set range and the ratio of the pixels emitting light is greater than or equal to a second threshold that is smaller than the first threshold.

19. The driving method of the display device of claim 18, further comprising:

stopping sensing of the plurality of pixels when the panel brightness value is within the set range and the ratio of the pixels emitting light is greater than or equal to the first threshold, and performing sensing of the plurality of pixels when the panel brightness value is outside the set range and the ratio of the pixels emitting light is less than the first threshold.

20. The driving method of the display device of claim 18, further comprising:

stopping sensing of the plurality of pixels when the panel brightness value is within the set range and the ratio of the pixels emitting light is greater than or equal to the second threshold, and performing sensing of the plurality of pixels when the panel brightness value is outside the set range and the ratio of the pixels emitting light is less than the second threshold.

* * * * *